US011116024B2

(12) United States Patent
Yu et al.

(10) Patent No.: US 11,116,024 B2
(45) Date of Patent: Sep. 7, 2021

(54) CONTROL MECHANISM FOR PACKET DUPLICATION IN MULTI-CONNECTIVITY COMMUNICATION

(71) Applicant: Nokia Technologies Oy, Espoo (FI)

(72) Inventors: Ling Yu, Kauniainen (FI); David Navratil, Helsinki (FI); Vinh Van Phan, Oulu (FI); Zexian Li, Espoo (FI)

(73) Assignee: Nokia Technologies Oy, Espoo (FI)

( * ) Notice: Subject to any disclaimer, the term of this patent is extended or adjusted under 35 U.S.C. 154(b) by 119 days.

(21) Appl. No.: 16/500,039

(22) PCT Filed: Apr. 10, 2017

(86) PCT No.: PCT/EP2017/058513
§ 371 (c)(1),
(2) Date: Oct. 1, 2019

(87) PCT Pub. No.: WO2018/188717
PCT Pub. Date: Oct. 18, 2018

(65) Prior Publication Data
US 2020/0187282 A1    Jun. 11, 2020

(51) Int. Cl.
*H04W 76/15* (2018.01)
*H04W 88/06* (2009.01)
(Continued)

(52) U.S. Cl.
CPC .............. *H04W 76/15* (2018.02); *H04L 1/18* (2013.01); *H04L 5/0055* (2013.01); *H04W 40/12* (2013.01); *H04W 88/06* (2013.01)

(58) Field of Classification Search
CPC ..... H04W 76/15; H04W 40/12; H04W 88/06; H04L 1/18; H04L 5/0055
See application file for complete search history.

(56) References Cited

U.S. PATENT DOCUMENTS

| 2014/0269632 A1 | 9/2014 | Blankenship et al. ........ 370/336 |
| 2015/0117313 A1* | 4/2015 | Ranta-Aho ............. H04L 47/32 370/328 |
| 2020/0059821 A1* | 2/2020 | Wirth .................... H04L 5/0094 |

FOREIGN PATENT DOCUMENTS

WO    WO-2017004830 A1 *   1/2017   ........ H04W 72/0446

OTHER PUBLICATIONS

EP17162655 priority document for US 2020/0059821 A1, filed Mar. 23, 2017. (Year: 2017).*

(Continued)

*Primary Examiner* — Melvin C Marcelo
(74) *Attorney, Agent, or Firm* — Harrington & Smith

(57) ABSTRACT

An apparatus for use by a packet duplication control element or function, the apparatus including processing circuitry, and memory for storing instructions to be executed by the processing circuitry, wherein the memory and the instructions are configured to, with the processing circuitry, cause the apparatus at least: to receive assistance information indicating communication conditions of at least one communication link between a communication element and at least two communication network access points, to process the assistance information for preparing a packet duplication control, to generate transmission control information on the basis of the result of the processing of the assistance information, the transmission control information indicating settings for a packet duplication process in the established multi-connectivity communication, and to send the transmission control information to at least one transmission control element or function being involved in the packet duplication process in the established multi-connectivity communication.

20 Claims, 9 Drawing Sheets

(51) Int. Cl.
*H04W 40/12* (2009.01)
*H04L 1/18* (2006.01)
*H04L 5/00* (2006.01)

(56) References Cited

OTHER PUBLICATIONS

R2-1701720, 'Packet duplication for URLLC within a gNB', Intel Corporation, 3GPP TSG-RAN WG2 97 meeting, Feb. 13-17, 2017, pp. 1-3. (Year: 2017).*

Hytonen, V., "Voice Traffic Bicasting Enhancements in Mobile HSPA Network", Aug. 26, 2014, Proceedings of the 11th International Symposium on Wireless Communications Systems (ISWCS), IEEE, pp. 633-637.

* cited by examiner

CONTROL MECHANISM FOR PACKET DUPLICATION IN MULTI-CONNECTIVITY COMMUNICATION

CROSS REFERENCE TO RELATED APPLICATION

This patent application is a U.S. National Stage application of International Patent Application Number PCT/EP2017/058513 filed Apr. 10, 2017, which is hereby incorporated by reference in its entirety.

BACKGROUND

Field

The present invention relates to apparatuses, methods, systems, computer programs, computer program products and computer-readable media usable for conducting a packet duplication control in a multi-connectivity communication environment.

Background Art

The following description of background art may include insights, discoveries, understandings or disclosures, or associations, together with disclosures not known to the relevant prior art, to at least some examples of embodiments of the present invention but provided by the invention. Some of such contributions of the invention may be specifically pointed out below, whereas other of such contributions of the invention will be apparent from the related context.

The following meanings for the abbreviations used in this specification apply:
3GPP: 3$^{rd}$ Generation Partner Project
ACK: acknowledgement
ARQ: automatic repeat request
BS: base station
CA: carrier aggregation
CPU: central processing unit
CQI: channel quality indication
DCI: downlink control information
DL: downlink
eMBB: enhanced mobile broadband
ETSI European Telecommunications Standards Institute
ID: identification, identifier
gNB: 5G base station
GPRS: general packet radio system
GTP-U: GPRS tunneling protocol user plane
HARQ: hybrid ARQ
LTE: Long Term Evolution
LTE-A: LTE Advanced
MAC: media access control
MCG: master cell group
MCS: modulation and coding scheme
NACK: negative acknowledgement
NR: new radio
PDCP: packet data convergence protocol
PDU: packet data unit
PHY: physical layer
PRB: physical resource block
RAN: radio access network
RLC: radio link control
RRC: radio resource control
RSRP: reference signal received power
SCG: secondary cell group
SDU: service data unit
SN: sequence number
III: transmission time interval
UE: user equipment
UL: uplink
UMTS: universal mobile telecommunication system
UP: user plane
URLLC: ultra-reliable and low latency communications Embodiments of the present invention are related to a mechanism which allows to establish a dynamic packet duplication control for increasing reliability and robustness of a wireless communication having a guaranteed level of reliability of a correct transmission of data.

SUMMARY

According to an example of an embodiment, there is provided, for example, an apparatus for use by a packet duplication control element or function, the apparatus comprising at least one processing circuitry, and at least one memory for storing instructions to be executed by the processing circuitry, wherein the at least one memory and the instructions are configured to, with the at least one processing circuitry, cause the apparatus at least: to receive assistance information indicating communication conditions of at least one communication link of an established multi-connectivity communication between a communication element and at least two communication network access points, to process the assistance information for preparing a packet duplication control wherein, in the packet duplication control, data to be communicated via at least one communication link of the established multi-connectivity communication are duplicated for being transmittable via another communication link of the established multi-connectivity communication, to generate transmission control information on the basis of the result of the processing of the assistance information, the transmission control information indicating settings for a packet duplication process in the established multi-connectivity communication, and to send the transmission control information to at least one transmission control element or function being involved in the packet duplication process in the established multi-connectivity communication.

Furthermore, according to an example of an embodiment, there is provided, for example, a method for use by a packet duplication control element or function, the method comprising receiving assistance information indicating communication conditions of at least one communication link of an established multi-connectivity communication between a communication element and at least two communication network access points, processing the assistance information for preparing a packet duplication control wherein, in the packet duplication control, data to be communicated via at least one communication link of the established multi-connectivity communication are duplicated for being transmittable via another communication link of the established multi-connectivity communication, generating transmission control information on the basis of the result of the processing of the assistance information, the transmission control information indicating settings for a packet duplication process in the established multi-connectivity communication, and sending the transmission control information to at least one transmission control element or function being involved in the packet duplication process in the established multi-connectivity communication.

According to further refinements, these examples may include one or more of the following features:

the assistance information may comprise at least one of an indication of an estimated probability of an erroneous transmission via the at least one communication link of the established multi-connectivity communication, an indication of an estimated probability of a successful transmission via the at least one communication link of the established multi-connectivity communication, an indication of an estimated probability of an erroneous transmission of a given data amount via the at least one communication link of the established multi-connectivity communication, an indication of an estimated probability of a successful transmission of a given data amount via the at least one communication link of the established multi-connectivity communication, an indication of an estimated probability of an erroneous transmission of a given data amount within a predetermined time via the at least one communication link of the established multi-connectivity communication, an indication of an estimated probability of a successful transmission of a given data amount within a predetermined time via the at least one communication link of the established multi-connectivity communication, an indication of a cost corresponding to an estimated probability of a successful transmission of a given data amount via the at least one communication link of the established multi-connectivity communication, and an indication of a cost corresponding to an estimated probability of an erroneous transmission of a given data amount via the at least one communication link of the established multi-connectivity communication;

the cost corresponding to an estimated probability of a successful transmission of a given data amount via the at least one communication link of the established multi-connectivity communication may comprise at least one of a portion of overall communication channel capacity, and a portion of currently unused communication channel capacity;

when processing the assistance information for preparing the packet duplication control, it may be determined whether or not a packet duplication is to be conducted, and in case it is determined to conduct a packet duplication, at least two links of the multi-connectivity communication may be selected to be used for a packet duplication process, a timing for transmitting the duplicated packet via a selected one of the at least two links of the multi-connectivity communication may be determined, and it may be decided whether a coordination between different links selected to be used for a packet duplication process regarding an automatic repeat processing is to be conducted;

the at least two links of the multi-connectivity communication to be used for a packet duplication process may be selected on the basis of comparing at least values of an estimated probability of an erroneous transmission or estimated probability of a successful transmission between links of the multi-connectivity communication with each other or a predetermined threshold, wherein information about at least one of data packet size and time budget may be considered, when available, in the selection of the at least two links;

an offset value may be determined for indicating a reliability target to be achieved for at least one of the at least two links of the multi-connectivity communication;

when generating the transmission control information on the basis of the result of the processing of the assistance information, as settings for the packet duplication process in the established multi-connectivity communication, at least one of an indication of whether a packet duplication processing is conducted via another link of the multi-connectivity communication, an indication to apply a specified timing for transmitting the duplicated packet via the link of the multi-connectivity communication, an indication to conduct a coordination with at least one other link selected used for the packet duplication process regarding an automatic repeat processing, an indication of a reliability target to be achieved for the link of the multi-connectivity communication, and an indication of an offset value related to a reliability target to be achieved for the link of the multi-connectivity communication may be provided;

the packet duplication control element or function may be a central network element connected to or a part of a packet data convergence protocol entity of a master network node of a cellular communication network capable of participating in a multi-connectivity communication with at least one communication element, wherein the communication element may be a terminal device or user equipment communicating in the cellular communication network, and the at least one a transmission control element or function being involved in the packet duplication process in the established multi-connectivity communication may comprise at least one of a media access control entity of the master network node or a media access control entity of at least one secondary network node in the multi-connectivity communication.

Furthermore, according to an example of an embodiment, there is provided, for example, an apparatus for use by a transmission control element or function, the apparatus comprising at least one processing circuitry, and at least one memory for storing instructions to be executed by the processing circuitry, wherein the at least one memory and the instructions are configured to, with the at least one processing circuitry, cause the apparatus at least: to determine communication conditions of at least one communication link of an established multi-connectivity communication between a communication element and at least two communication network access points, to generate assistance information on the basis of the determined communication conditions, to send the assistance information to a packet duplication control element or function, to receive, from the packet duplication control element or function, and process transmission control information indicating settings for a packet duplication control in the established multi-connectivity communication, wherein, in the packet duplication control, data to be communicated via at least one communication link of the established multi-connectivity communication are duplicated for being transmittable via another communication link of the established multi-connectivity communication, and to conduct a transmission control for a packet duplication processing in the established multi-connectivity communication in accordance with the transmission control information.

In addition, according to an example of an embodiment, there is provided, for example, a method for use by a transmission control element or function, the method comprising determining communication conditions of at least one communication link of an established multi-connectivity communication between a communication element and at least two communication network access points, generating assistance information on the basis of the determined communication conditions, sending the assistance information to a packet duplication control element or function, receiving, from the packet duplication control element or function, and processing transmission control information indicating settings for a packet duplication control in the established multi-connectivity communication, wherein, in the packet duplication control, data to be communicated via at least one communication link of the established multi-connectivity communication are duplicated for being transmittable via another communication link of the established multi-connectivity communication, and conducting a transmission control for a packet duplication processing in the established multi-connectivity communication in accordance with the transmission control information.

According to further refinements, these examples may include one or more of the following features:

- when determining the communication conditions of the at least one communication link of the established multi-connectivity communication, an estimated probability of an erroneous transmission via the at least one communication link or an estimated probability of a successful transmission via the at least one communication link on the basis of a connection quality with the communication element may be calculated, a data size that can be provided within a specified time period may be estimated on the basis of a used modulation and coding scheme and an amount of available resources for the communication element, and a time budget for achieving a specific transmission performance may be determined;
- the assistance information may comprise at least one of an indication of an estimated probability of an erroneous transmission via the at least one communication link of the established multi-connectivity communication, an indication of an estimated probability of a successful transmission via the at least one communication link of the established multi-connectivity communication, an indication of an estimated probability of an erroneous transmission of a given data amount via the at least one communication link of the established multi-connectivity communication, an indication of an estimated probability of a successful transmission of a given data amount via the at least one communication link of the established multi-connectivity communication, an indication of an estimated probability of an erroneous transmission of a given data amount within a predetermined time via the at least one communication link of the established multi-connectivity communication, an indication of an estimated probability of a successful transmission of a given data amount within a predetermined time via the at least one communication link of the established multi-connectivity communication, an indication of a cost corresponding to an estimated probability of a successful transmission of a given data amount via the at least one communication link of the established multi-connectivity communication, and an indication of a cost corresponding to an estimated probability of an erroneous transmission of a given data amount via the at least one communication link of the established multi-connectivity communication;
- the cost corresponding to an estimated probability of a successful transmission of a given data amount via the at least one communication link of the established multi-connectivity communication may comprise at least one of a portion of overall communication channel capacity, and a portion of currently unused communication channel capacity;
- it may be decided to limit sending of the assistance information to the packet duplication control element or function on the basis of a check as to whether or not current communication conditions are within a predefined range allowing to fulfill a previously received setting for a packet duplication control;
- when processing the transmission control information, it may be determined whether a packet duplication process is conducted via another link of the multi-connectivity communication, an automatic repeat processing for a packet duplication process via the link of the multi-connectivity communication may be enabled or disabled, on the basis of the determination regarding packet duplication process via another link, a transmission in the packet duplication process at a specified timing for transmitting the duplicated packet via the link of the multi-connectivity communication may be prepared, a coordination with at least one other link used for the packet duplication process regarding an automatic repeat processing may be prepared, and a reliability target to be achieved for the link of the multi-connectivity communication may be determined;
- when processing the transmission control information, for preparing the coordination with at least one other link used for the packet duplication process regarding an automatic repeat processing, an uplink grant for the communication element to transmit an indication regarding acknowledgment or negative acknowledgment of reception via the other link of data corresponding to the duplicated data may be given;
- the packet duplication control element or function may be a central network element connected to or a part of a packet data convergence protocol entity of a master network node of a cellular communication network capable of participating in a multi-connectivity communication with at least one communication element, wherein the communication element may be a terminal device or user equipment communicating in the cellular communication network, and the transmission control element or function being involved in the packet duplication process in the established multi-connectivity communication may comprise at least one of a media access control entity of the master network node or a media access control entity of at least one secondary network node in the multi-connectivity communication.

Furthermore, according to an example of an embodiment, there is provided, for example, an apparatus for use by a communication element, the apparatus comprising at least one processing circuitry, and at least one memory for storing instructions to be executed by the processing circuitry, wherein the at least one memory and the instructions are configured to, with the at least one processing circuitry, cause the apparatus at least: to receive and process an indication to provide an information about a successful or unsuccessful reception of data via at least one first communication link of an established multi-connectivity communication between the communication element and at least two communication network access points to a transmission control element or function of at least one other link of the established multi-connectivity communication, to determine whether the data reception via the at least one first communication link is successfully completed or not, and to send an acknowledgement or negative acknowledgment indication reflecting the successful or unsuccessful reception of the data to at least one transmission control element or function of another link of the established multi-connectivity communication.

In addition, according to an example of an embodiment, there is provided, for example, a method for use by a communication element, the method comprising receiving and processing an indication to provide an information about a successful or unsuccessful reception of data via at least one first communication link of an established multi-connectivity communication between the communication element and at least two communication network access points to a transmission control element or function of at least one other link of the established multi-connectivity communication, determining whether the data reception via the at least one first communication link is successfully completed or not, and sending an acknowledgement or negative acknowledgment indication reflecting the successful or unsuccessful reception of the data to at least one transmission control element or function of another link of the established multi-connectivity communication.

According to further refinements, these examples may include one or more of the following features:
- the indication may be an uplink grant provided by the transmission control element or function of the at least one other link of the established multi-connectivity communication;
- an identification of the data being successfully or unsuccessfully received with the acknowledgement or negative acknowledgment indication sent to the transmission control element or function may be provided;
- as the identification of the data being successfully or unsuccessfully received with the acknowledgement or negative acknowledgment indication sent to the transmission control element or function, one of a set of least bits of a sequence number related to a transmitted data packet, a predetermined sequence number or a process ID related to an automatic repeat processing may be provided;
- the communication element may a terminal device or user equipment capable of participating in a multi-connectivity communication in a cellular communication network, and the at least one transmission control element or function may comprise at least one of a media access control entity of a master network node or a media access control entity of at least one secondary network node in the multi-connectivity communication.

In addition, according to embodiments, there is provided, for example, a computer program product for a computer, including software code portions for performing the steps of the above defined methods, when said product is run on the computer. The computer program product may include a computer-readable medium on which said software code portions are stored. Furthermore, the computer program product may be directly loadable into the internal memory of the computer and/or transmittable via a network by means of at least one of upload, download and push procedures.

BRIEF DESCRIPTION OF THE DRAWINGS

Some embodiments of the present invention are described below, by way of example only, with reference to the accompanying drawings, in which.

DESCRIPTION OF EMBODIMENTS

Figure 1:
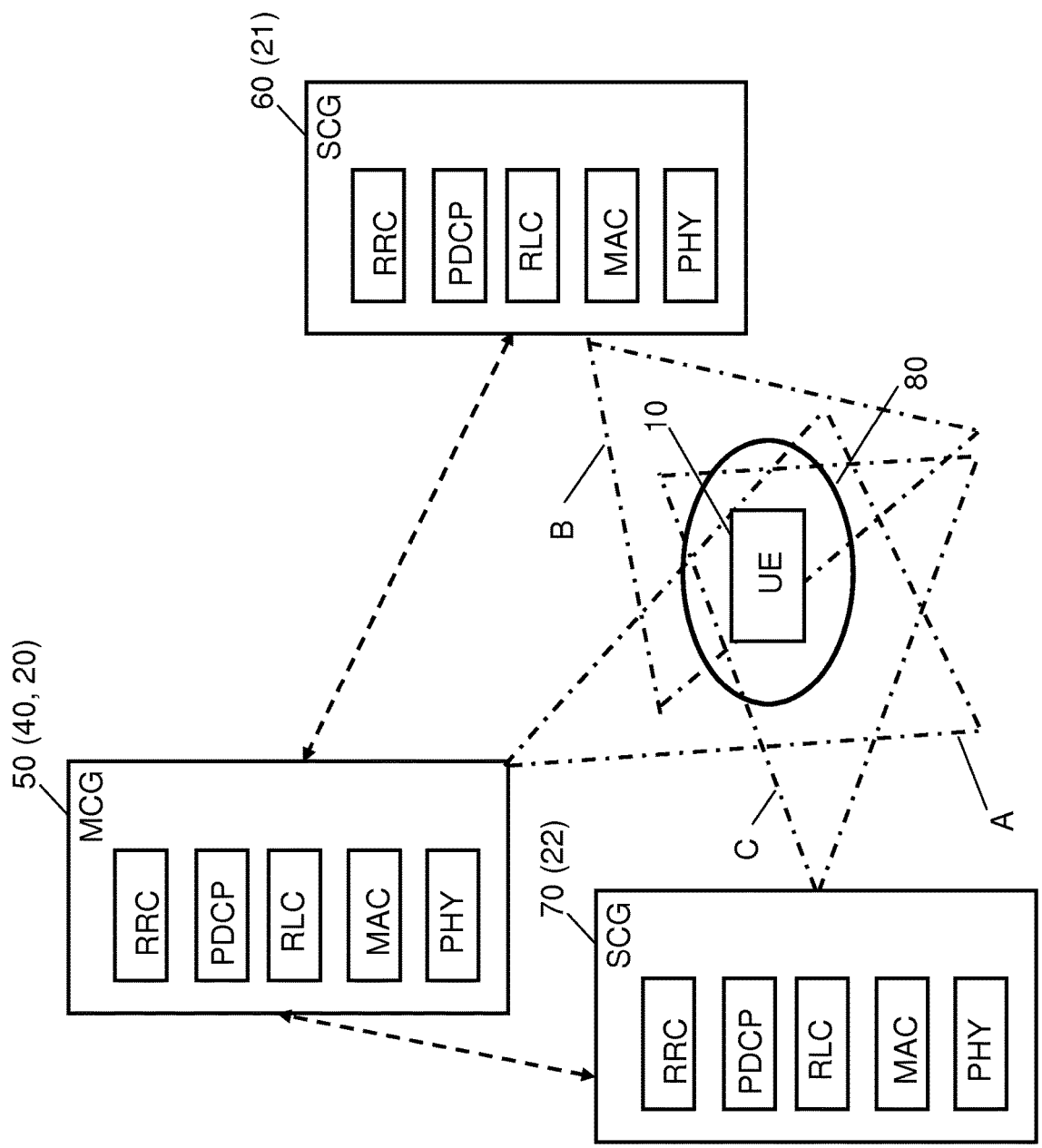
FIG. 1 shows a diagram illustrating a configuration of a communication network environment where some examples of embodiments are implementable.

In the last years, an increasing extension of communication networks, e.g. of wire based communication networks, such as the Integrated Services Digital Network (ISDN), DSL, or wireless communication networks, such as the cdma2000 (code division multiple access) system, cellular $3^{rd}$ generation (3G) like the Universal Mobile Telecommunications System (UMTS), fourth generation (4G) communication networks or enhanced communication networks based e.g. on LTE or LTE-A, fifth generation (5G) communication networks, cellular $2^{nd}$ generation (2G) communication networks like the Global System for Mobile communications (GSM), the General Packet Radio System (GPRS), the Enhanced Data Rates for Global Evolution (EDGE), or other wireless communication system, such as the Wireless Local Area Network (WLAN), Bluetooth or Worldwide Interoperability for Microwave Access (WiMAX), took place all over the world. Various organizations, such as the European Telecommunications Standards Institute (EIS), the $3^{rd}$ Generation Partnership Project (3GPP), Telecoms & Internet converged Services & Protocols for Advanced Networks (TISPAN), the International Telecommunication Union (ITU), $3^{rd}$ Generation Partnership Project 2 (3GPP2), Internet Engineering Task Force (IETF), the IEEE (Institute of Electrical and Electronics Engineers), the WiMAX Forum and the like are working on standards or specifications for telecommunication network and access environments.

Generally, for properly establishing and handling a communication connection between two or more end points (e.g. communication stations or elements, such as terminal devices, user equipments (UEs), or other communication network elements, a database, a server, host etc.), one or more network elements such as communication network control elements, for example access network elements like access points, radio base stations, eNBs, gNBs etc., and core network elements or functions, for example control nodes, support nodes, service nodes, gateways etc., may be involved, which may belong to one communication network system or different communication network systems.

Future communication networks, such as the fifth generation of mobile technology (5G), is developed for fulfilling growing demands on telecommunication systems. Demands include a growth in connectivity and density/ volume of traffic, a multi-layer densification in enabling this, and a broad range of use cases and business models.

Therefore, in new telecommunication systems like 5G, it is necessary to provide, where needed, greater throughput, lower latency, ultra-high reliability, higher connectivity density, and higher mobility range. This is expected to be provided along with the capability to control a highly heterogeneous environment, and capability to, among others, ensure security and trust, identity, and privacy.

Usage scenarios and applications supported in e.g. 5G include, for example, enhanced mobile broadband (eMBB) addressing human-centric use cases for access to multimedia content, services and data, ultra-reliable-low latency communications (URLLC) with strict requirements, especially in terms of latency and reliability, and massive machine type communications for a very large number of connected devices and typically transmitting a relatively low volume of non-delay-sensitive information.

For such usage scenarios, it is necessary to fulfill specific requirements on data rates, reliability, and availability. For example, in URLLC scenarios, such as industrial control, tactile Internet or the like, a low latency (ms level) and reliability (five nines (99.999%), and beyond) together with zero mobility interruption are required, e.g. in order to connect cars, in some high mobility cases, drones or mobile service robots. It is to be noted that latency, such as user plane latency, is the time it takes to successfully deliver e.g. an application layer packet/message from the radio protocol layer ingress point to the radio protocol layer egress point via the radio interface in both UL and DL directions (see, for example, 3GPP specification TR 38.913 v14.2.0). For URLLC, one defined target for user plane latency is 0.5 ms for UL, and 0.5 ms for DL, for example. Reliability, on the other hand, can be evaluated by the success probability of transmitting X bytes within a certain time window, which is the time it takes to deliver a small data packet from the radio protocol layer ingress point to the radio protocol layer egress point of the radio interface, at a certain channel quality (e.g., coverage-edge). A possible URLLC reliability requirement for one transmission of a packet is $1\text{-}10^{-5}$ for 32 bytes with a user plane latency of 1 ms, for example.

As one approach for achieving these requirements, heterogeneous radio access technologies and deployments are used. For example, dual-connectivity or multi-connectivity is employed for connecting a terminal element such as a UE to various access points of one or more networks, which include also a multiple different technologies, simultaneously. It is to be noted that in the following the term "multi-connectivity" is used to define multi-connectivity communications covering dual-connectivity as well.

In multi-connectivity communication scenarios, a single user terminal is connected to multiple radio access points, wherein simultaneous connectivity and aggregation across different technologies such as 5G, 4G (e.g. 3GPP LTE), and unlicensed technologies such as IEEE 802.11 (Wi-Fi), MultiFire is supported. In addition, connection to multiple network layers, such as macro and small cells and multiple radio access technology (RAT) layers is possible.

Considering the requirements which are associated with 5G deployment, such as the reliability requirements within the required latency target, packet duplication is an option for achieving this. Packet duplication means that data or packets which are to be communicated via one link between the UE and the network are duplicated to be transmitted via another link between the UE and the network in a multi-connectivity communication being established. For example, packet duplication is supported for user plane and control plane in NR-PDCP, wherein a PDCP function or entity in the transmitter supports packet duplication and the PDCP function or entity in the receiver supports duplicate packet removal. RLC retransmission (ARQ) is not assumed to be used for meeting the strict user plane latency requirements of URLLC because of a generally large RLC round trip time, i.e. the time between the transmission of RLC PDU and reception of a negative acknowledgement. On the other hand, for DL and UL, duplication solution for CA case uses PDCP duplication to more than 1 logical channel so that the duplicated PDCP PDUs are sent over different carriers.

In the following, different exemplifying embodiments will be described using, as an example of a communication network to which the embodiments may be applied, a communication network architecture based on 3GPP standards, such as 5G communication networks, without restricting the embodiments to such architectures, however. It is obvious for a person skilled in the art that the embodiments may also be applied to other kinds of communication networks having suitable means by adjusting parameters and procedures appropriately, e.g. 4G (LTE) networks, WiFi, worldwide interoperability for microwave access (WiMAX), Bluetooth®, personal communications services (PCS), ZigBee®, wideband code division multiple access (WCDMA), systems using ultra-wideband (UWB) technology, mobile ad-hoc networks (MANETs), wired access, etc. Furthermore, without loss of generality, the description of some examples of embodiments is related to a multi-connectivity communication in a 5G environment in which URLLC is conducted, but principles of the invention can be extended and applied to any other type of services or use cases where a dual or multi-connectivity communication in a single network type (e.g. 5G) or in a plurality of networks types (e.g. LTE-5G dual connectivity) is used for establishing and conducting a communication with a certain level of reliability within a specific time window (delay)/latency budget is to be guaranteed (e.g. eMBB).

The following examples and embodiments are to be understood only as illustrative examples. Although the specification may refer to "an", "one", or "some" example(s) or embodiment(s) in several locations, this does not necessarily mean that each such reference is related to the same example(s) or embodiment(s), or that the feature only applies to a single example or embodiment. Single features of different embodiments may also be combined to provide other embodiments. Furthermore, terms like "comprising" and "including" should be understood as not limiting the described embodiments to consist of only those features that have been mentioned; such examples and embodiments may also contain features, structures, units, modules etc. that have not been specifically mentioned.

A basic system architecture of a (tele)communication network including a communication system where some examples of embodiments are applicable may include an architecture of one or more communication networks including a wired or wireless access network subsystem and a core network. Such an architecture may include one or more communication network control elements, access network elements, radio access network elements, access service network gateways or base transceiver stations, such as a base station (BS), an access point (AP), a NodeB (NB), an eNB or a gNB, which control a respective coverage area or cell(s) and with which one or more communication stations such as communication elements, user devices or terminal devices, like a UE or a vehicle, or another device having a similar function, such as a modem chipset, a chip, a module etc., which can also be part of a station, an element, a function or an application capable of conducting a communication, such as a UE, an element or function usable in a machine-to-machine communication architecture, or attached as a separate element to such an element, function or application capable of conducting a communication, or the like, are capable to communicate via one or more channels for transmitting several types of data in a plurality of access domains. Furthermore, core network elements such as gateway network elements, mobility management entities, a mobile switching center, servers, databases and the like may be included.

The general functions and interconnections of the described elements, which also depend on the actual network type, are known to those skilled in the art and described in corresponding specifications, so that a detailed description thereof is omitted herein. However, it is to be noted that several additional network elements and signaling links may be employed for a communication to or from an element, function or application, like a communication endpoint, a communication network control element, such as a server, a radio network controller, and other elements of the same or other communication networks besides those described in detail herein below.

A communication network as being considered in examples of embodiments may also be able to communicate with other networks, such as a public switched telephone network or the Internet. The communication network may also be able to support the usage of cloud services for virtual network elements or functions thereof, wherein it is to be noted that the virtual network part of the telecommunication network can also be provided by non-cloud resources, e.g. an internal network or the like. It should be appreciated that network elements of an access system, of a core network etc., and/or respective functionalities may be implemented by using any node, host, server, access node or entity etc. being suitable for such a usage.

Furthermore, a network element, such as communication elements, like a UE, a terminal device, control elements or functions, such as access network elements, like a base station, an gNB, a radio network controller, other network elements, like a core network element, a mobility management element or function, a server, etc., as well as corresponding functions as described herein, and other elements, functions or applications may be implemented by software, e.g. by a computer program product for a computer, and/or by hardware. For executing their respective functions, correspondingly used devices, nodes, functions or network elements may include several means, modules, units, components, etc. (not shown) which are required for control, processing and/or communication/signaling functionality. Such means, modules, units and components may include, for example, one or more processors or processor units including one or more processing portions for executing instructions and/or programs and/or for processing data, storage or memory units or means for storing instructions, programs and/or data, for serving as a work area of the processor or processing portion and the like (e.g. ROM, RAM, EEPROM, and the like), input or interface means for inputting data and instructions by software (e.g. floppy disc, CD-ROM, EEPROM, and the like), a user interface for providing monitor and manipulation possibilities to a user (e.g. a screen, a keyboard and the like), other interface or means for establishing links and/or connections under the control of the processor unit or portion (e.g. wired and wireless interface means, radio interface means including e.g. an antenna unit or the like, means for forming a radio communication part etc.) and the like, wherein respective means forming an interface, such as a radio communication part, can be also located on a remote site (e.g. a radio head or a radio station etc.). It is to be noted that in the present specification processing portions should not be only considered to represent physical portions of one or more processors, but may also be considered as a logical division of the referred processing tasks performed by one or more processors.

It should be appreciated that according to some examples, a so-called "liquid" or flexible network concept may be employed where the operations and functionalities of a network element, a network function, or of another entity of the network, may be performed in different entities or functions, such as in a node, host or server, in a flexible manner. In other words, a "division of labor" between involved network elements, functions or entities may vary case by case.

FIG. 1 shows a diagram illustrating a configuration of communication network environment where some examples of embodiments are implementable. It is to be noted that the configuration indicated in FIG. 1 shows only a simplified architecture and hence those parts which are useful for understanding principles underlying some examples of embodiments of the invention. As also known by those skilled in the art there may be several other network elements or devices involved e.g. in a communication which are omitted here for the sake of simplicity. Furthermore, it is to be noted that links indicated in FIG. 1 are intended to show only principle examples of connections between respective network parts. It is possible that also additional or alternative links besides those indicated in FIG. 1 are provided in a corresponding network, and/or that respective network elements or functions communicate with other network elements or functions by using intermediate nodes shown or not shown in FIG. 1. It is to be noted that examples of embodiments are not limited to the number of communication stations, elements, functions, and links as indicated in FIG. 1, i.e. there may be implemented or present less of or more of the corresponding stations, elements, functions, and links than those shown in FIG. 1.

As shown in FIG. 1, a communication element 10, such as a UE, is located within a communication network environment. It is assumed in the scenario according to FIG. 1 that the UE 10 is capable of conducting a multi-connectivity communication with a plurality of access points.

Access to the communication network is provided by control elements or functions, such as access points or base stations like BS or gNBs providing a wireless interface between the communication element 10 and the network. Each access network element can be configured to cover a corresponding coverage area, also referred to as cell, in which a communication with the UE 10 is possible. Specifically, in the example of FIG. 1, gNBs 50, 60 and 70 are shown, wherein gNB 50 covers a cell A, gNB 60 covers a cell B, and gNB 70 covers a cell C. It is to be noted that the communication indicated in FIG. 1 is, as indicated above, a multi-connectivity communication, in which gNB 50 acts as a master network node (MCG) and gNBs 60, 70 act as secondary network nodes (SCGs).

The gNBs 50, 60, 70 can be connected to each other via several types of interfaces and connections. For example, an interface based on a X2 application protocol (X2AP) (such as an XnAP interface representing an evolution of X2AP) for control data and/or a GTP-U interface for user plane data is provided as a connecting between the master network node (MCG 50) and the respective secondary network node (SCG 60 and 70, respectively). However, links or connections (such as the interfaces indicated above) between the respective network elements or functions are not limited to these examples. Details of these links, interfaces and connections may be implementation specific and generally known to those skilled in the art, so that a detailed description of each interface or link between the elements and functions according to an example as shown in FIG. 1 is omitted.

In each gNB 50, 60, 70, a protocol stack according to 3GPP is illustrated as an exemplary internal configuration of the respective network element, wherein the protocols are used for controlling and conducting a communication with the UE 10. A physical layer (PHY) carries information from MAC transport channels over the air interface and is used, for example, for cell search (for initial synchronization and handover purposes) and other measurements for RRC layer. The MAC layer is responsible for mapping between logical channels and transport channels, multiplexing/de-multiplexing, scheduling information reporting, error correction through HARQ, priority handling between UEs by means of dynamic scheduling, priority handling between logical channels of one UE. RLC Layer is responsible for transfer of upper layer PDUs, error correction through ARQ, etc. RRC sublayer include broadcast of system information, paging, establishment, maintenance and release of an RRC connection between the UE and the network, security functions. PDCP Layer is responsible for header compression and decompression of IP data, transfer of data (user plane or control plane), maintenance of PDCP Sequence Numbers (SNs), duplicate elimination of data, ciphering and deciphering of user plane data and control plane data, integrity protection and integrity verification of control plane data, timer based discard, duplicate discarding.

It is to be noted that more access network elements may be provided in the network, each covering a corresponding coverage area. Furthermore, additional or alternative access network elements can be provided, which use the same or another radio access technology, such as relay nodes, micro cells, wireless local area network nodes and the like, which can be seen in the context of examples of embodiments as corresponding access network elements or functions for the UE 10. Furthermore, even though FIG. 1 shows an example of one UE 10 and a plurality of gNBs, it is to be noted that examples of embodiments are not limited to these numbers. More or less elements or functions can be involved in a control procedure according to examples of embodiments. For example, a group of users including a plurality of UEs may be connected to the network.

Assuming now a communication between UE 10 and three cells A, B, C being established. Circle 80 indicates an area in which a single connectivity is not sufficient to meet certain requirements for a communication of the UE 10, such as URLLC requirements, for example due to poor radio link quality of one link and/or the available capacity of the other links. For example, URLLC requirement cannot be guaranteed for UE 10 by single cell A or C alone as the load in specific cells (e.g. Cell A and C) is high, due to a large number of UEs communicating therein, or the like. Meanwhile, URLLC requirement cannot be guaranteed for UE 10 by single cell B, for example since UE 10 is in the cell edge of cell B and/or the radio link quality is not sufficient. Hence, multi-connectivity is established. For example, RSRP measurements of different neighboring cells are conducted in order to determine which cell or cells is/are suitable for multi-connectivity communication. As indicated above, high reliability within a given latency budget is achieved by applying packet duplication (i.e. PDCP duplication).

Basically, one approach to apply packet duplication in case of multi-connectivity is to duplicate the PDCP data to all the links. However, in this case, even if the UE 10 has established the multi-connectivity communication in area 80, a link quality of the multiple links may be different e.g. depending on where the UE 10 is located within the area 80. Furthermore, there may be a situation that it is not needed or possible to duplicate the data over every link. For example, in case one additional link is sufficient to achieve the reliability requirement for the data available in PDCP buffer, packet duplication for the other link would be not required. On the other hand, there may be also the situation that one or more links can only guarantee transmission with a certain reliability, which may be either above or below the required reliability, for smaller data amount than the data in PDCP buffer.

It is to be noted that it may be required, e.g. due to the ultra low latency requirement of URLLC, that data coming to the RAN buffer are to be transmitted almost immediately without many segmentation and retransmissions over the radio link.

In case the multi-connectivity communication of the UE 10 is configured with two cells for duplication, the PDCP data are duplicated over both links, if the reliability of one link is not sufficient.

However, in case the multi-connectivity communication is established with three (or more cells), there are situations where it is preferable that the data are not duplicated over all cells (links). For example, if only a subset of the configured cells can meet a given reliability requirement, duplication to more than the subset would waste resources.

On the other hand, cells may be configured to share the load required for packet duplication so that the required resources can be provided in a cooperative manner by a plurality of cells.

Managing multi-connectivity configuration based on requirements for packet duplication (e.g. PDCP duplication) requires signaling between involved network entities. Hence, signaling overhead may be increased, e.g. by frequent addition or removal of cells from UE's configuration via RRC signaling. Therefore, it is seen beneficial to decouple the multi-connectivity configuration and packet duplication control. In other words, it is considered to improve, by providing a dynamic packet duplication and split control, system performance in term of efficiency, signaling overhead and latency control.

Figure 2:
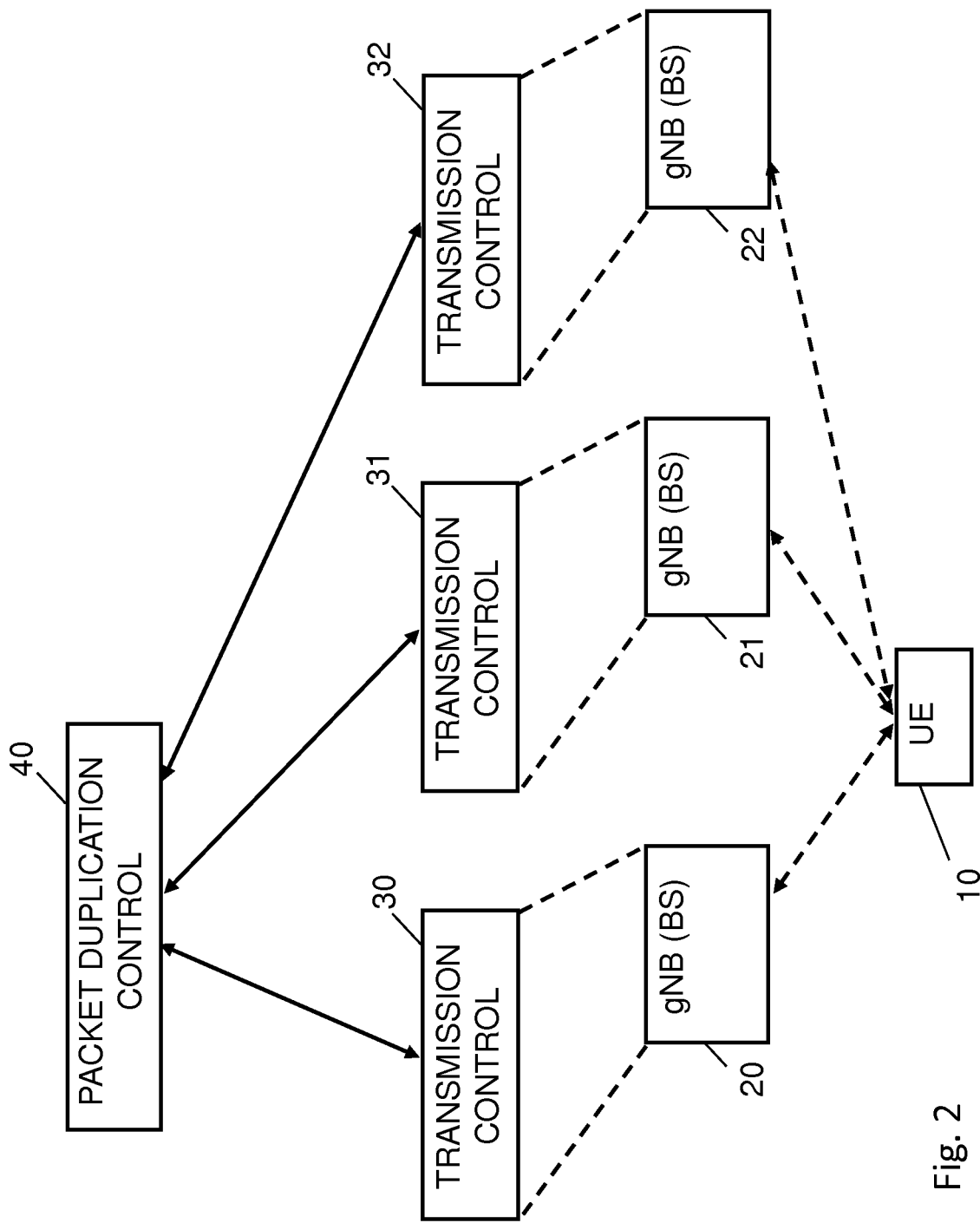
FIG. 2 shows a diagram illustrating a general configuration of functional entities in a packet duplication control according to some examples of embodiments.

Consequently, according to some examples of embodiments of the invention, a packet duplication control scheme is provided which allows to achieve such an improvement. FIG. 2 shows a diagram illustrating a general configuration of functional entities in a packet duplication control according to some examples of embodiments.

The process of packet duplication control in a wireless communication system with multi-connectivity communication according to examples of embodiments involves a packet duplication control element or function 40 and two or more transmission control elements or functions 31, 32, 33.

For example, the packet duplication control element or function 40 is provided by or in a central network node, such as a control node or server, or in a communication network control element or function like a base station or the like. For example, the PDCP entity of an access node, such as a gNB is acting as the packet duplication control element or function 40, like the PDCP entity of the master node (MCG) 50 shown in FIG. 1.

The two or more transmission control elements or functions 31, 32, 33 are each related to a corresponding access network control element like a gNB 20, 21, 22, respectively, and used for controlling a data transmission between the respective network element and a UE, e.g. UE 10. For example, the transmission control elements or functions 30, 31, 32 are realized by a MAC entity of a gNB. Referring to the example shown in FIG. 1, MAC entities of MCG 50 and SCGs 60, 70 represent corresponding transmission control elements or functions.

The packet duplication control element or function 40 and two or more transmission control elements or functions 31, 32, 33 are connected with each other by means of suitable links and interfaces, such as the XnAP interface for control data and GTP-U interface for user plane data.

In the following, measures conducted for packet duplication control according to some examples of embodiments are described with reference to the configuration of FIG. 2.

As described above, since a multi-connectivity communication is assumed, the packet duplication control element or function 40 (e.g. the PDCP entity of a master network node) is performing packet duplication in cooperation with at least two transmission control elements or functions 30 to 32, wherein each of the transmission control elements or functions 30 to 32 is related to a corresponding base station of the communication system; for example, the master network node and one or more secondary network nodes are involved, or the transmission control concerns only secondary network nodes.

In a first phase of the packet duplication control, information about the wireless communication link between the base station to which the respective transmission control element or function is related and the UE 10 are transmitted from each of the transmission control elements or functions (e.g. the secondary network nodes) to the packet duplication control element or function (e.g. the master network node). In the following, this information is also referred to as assistance information.

The assistance information comprises, for example, information related to the communication condition on each link. According to some examples of embodiments, for example, an estimated probability of erroneous transmission (P_x) (or the inverse value, i.e. the estimated probability of successful transmission) is included. The estimated probability may be based on, for examples, measured or monitored bit error rate, block error rate or packet error rate on relevant transmissions of the UE. Alternatively, one or more doubles (P_x, DS_x) representing the estimated probability of erroneous/successful transmission of a given data amount is transmitted. Furthermore, as another alternative, one or more triples (P_x, DS_x, D_x) representing the estimated probability of erroneous/successful transmission of a given data amount within a given time is transmitted. According to other examples of embodiments, the assistance information also includes an estimated cost associated with the above parameters, such as (P_x), (P_x, DS_x) or (P_x, DS_x, D_x). The estimated cost represents, for example, at least one of a portion of wireless channel capacity required corresponding to an estimated probability of erroneous/successful transmission and a portion of a currently unused communication channel capacity.

On the basis of the assistance information being received from the transmission control elements or functions, the packet duplication control element or function determines whether packet duplication is to be applied or not, e.g. on the basis of the available resources are sufficient. In case it is determined that the packet duplication is to be applied, the packet duplication control element or function decides also over which of the available links (i.e. which cells of the master and/or secondary network nodes) duplicated data are to be provided.

According to further examples of embodiments, the packet duplication control element or function determines also whether the corresponding transmission control element or function (e.g. a selected secondary network node) has to apply a specific timing or offset timing. This may concern, for example, to determine whether the transmission of the duplicated data is to be done in the current TTI or a following up TTI.

Moreover, according to some examples of embodiments of the invention, the packet duplication control element or function determines also whether an automatic repeat request such as a HARQ operation is to be coordinated among the different links involved in the packet duplication processing, e.g. between the involved master/secondary network nodes.

The result of the processing of the assistance information is then used to generate a set of information or instructions for the transmission control elements or functions. This set of information is referred to hereinafter as transmission control information. The transmission control information is transferred from the packet duplication control element or function to the transmission control elements or functions for assisting the transmission of duplicated data over the wireless communication links.

According to some examples of embodiments, the transmission control information comprises one or more of the following elements: an indication whether data is being duplicated over other link(s) or not, a request to apply a timing for the transmission, a reliability target, and an indication whether HARQ operation should be coordinated.

The transmission control information is processed by the transmission control elements or functions (e.g. in the secondary network nodes) for determining a corresponding processing in the packet duplication process. For example, in case corresponding information is included, it is determined whether HARQ retransmission is to be enabled or not, and/or whether preparations for the coordination of HARQ operation are to be executed, such as the provision of an UL grant to the UE for HARQ ACK/NACK feedback related to another link.

In the following, the above discussed processing is further explained by referring to a network configuration as indicated in FIG. 1, i.e. in case a multi-connectivity communication in a 5G network is used for achieving requirements related to URLLC.

In detail, in the following explanation, it is assumed that as the packet duplication control element or function, the common PDCP entity of the master node 50 (i.e. MCG PDCP) is responsible for packet duplication, and the transmission control elements or functions are part of the master node and a plurality of secondary nodes (gNBs), wherein a MAC layer is used in this function (i.e. MCG/SCG MAC).

According to an example of embodiments, as assistance information, PDCP duplication-and-split assistance information is introduced from MCG/SCG MAC to MCG PDCP over Xn interface. Specifically, the assistance information from one MCG/SCG MAC may be in the form of {P_x, P_y, . . . } or a list of {(P_x, DS_x); (P_y, DS_y); . . . } or a list of {(P_x, DS_x, D_x); (P_y, DS_y, D_y); . . . }.

For example, P_x/P_y is the probability of erroneous transmission, DS_x/DS_y is the data size and D_x/D_y is the expected maximum transport delay (time window). The double (P_x, DS_x) means that MCG/SCG MAC can deliver a data packet of DS_x size with an erroneous probability P_x. The triple (P_x, DS_x, D_x) means that MCG/SCG MAC can deliver a data packet of DS_x size with an erroneous probability P_x within a time window D_x.

The values of P_x/P_y are calculated by each MAC entity on the basis of a CQI report from the UE, for example, wherein DS_x/DS_y is the data size that each MAC entity can offer to the PDCP entity within the latency requirement or within D_x/D_y (if D_x/D_y is provided). The parameter DS_x/DS_y is estimated, for example, by the MAC entity on the basis of an MCS corresponding to the reported CQI and available resources (e.g. a number of PRBs) for the UE in question. The parameter D_x/D_y is, for example, the time budget to achieve the corresponding P_x/P_y and DS_x/DS_y and may depend on the available resources in each of the following subframe(s), wherein also potential retransmission(s)/repetition(s) may be taken into account.

It is to be noted that the suffixes x and y are related to different values for the corresponding parameter. For instance, P_x, DS_x, D_x represent, for example, (1% packet error rate, 5000 bits data size, 0.25 ms delay), while P_y, DS_y, D_y represents (0.1% packet error rate, 2000 bits data size, 0.5 ms delay) etc.

According to some examples of embodiments, measures for limiting an assistance information exchange frequency between the transmission control elements or functions and the packet duplication control element or function may be considered. For example, when referring to the configuration shown in FIG. 1 as a corresponding implementation example, each of the MCG/SCG MAC entities may determine the values P, DS, D for a certain range of CQI and available resources. That is, a one-to-one mapping between CQI, resources and those values is not considered. For instance, it may be determined not to send the assistance information from MCG/SCG MAC to MCG PDCP in case the MCG/SCG MAC entity can afford to allocate more PRBs to the link towards the UE in order to keep the same P and DS even though the UE has reported a lower/poorer CQI than before.

In another instance, a predefined set of constraint values for elements of the assistance information can be configured. For example, a predefined set of constraint values for the tuple (P, DS) or the triple (P, DS, D) is configured in advance and applied for the involved MCG and SCG, wherein each predefined constraint of the tuple/triple may be represented or mapped on a tuple/triple profile ID. For example, Tuple_Profile_ID=1 is mapped on a set of parameter values P<=1% and DS<=100 bytes. The involved MAC entities then determine and update the PDCP entity with a reassured Tuple_Profile_ID. According to some examples of embodiments, corresponding mapping rules/triggers for the MAC entities used for determining and updating the assistance information to the PDCP entity may be configured and controlled by the serving network.

According to some further examples of embodiments, the transmission of the assistance information can be integrated with user plane data transmission or implemented using control plane signaling. For example, a transmission over Xn interface may be conducted either via GTP-U or XnAP. The GTP-U option is used, for example, for more frequent and real-time assistance information and can be piggy-packed into the UL data packet over Xn interface. On the other hand, the XnAP is used for a more robust/reliable assistance information exchange procedure wherein an additional latency and more signaling overhead may be caused in case a frequent assistance information update is required.

According to further examples of embodiments, the packet duplication control element or function, such as the MCG PDCP entity of FIG. 1, makes, on the basis of the assistance information, a decision regarding packet duplication in the following manner.

As links to be used for packet duplication processing, the packet duplication control element or function selects links with a predetermined P_x or with the best available P_x for duplicating the data, for example. For example, the relation P_x_1*P_x_2* . . . *P_x_n<reliability requirement (if only P_x is provided for each link in the assistance information) is considered for the link selection where P_x_n is the reliability of the $n^{th}$ link. It is to be noted that according to some examples of embodiments, in case the parameter related to the associated cost is included in the assistance information and in case the reliability requirement can be met by at least two distinct combinations of links, the packet duplication control element or function selects links on the basis of the reliability and the cost.

Furthermore, in case the parameter DS is included in the assistance information received from the transmission control element or function, the indicated DS and the data amount in the PDCP buffer are taken into account. For example, the MCG PDCP determines to duplicate the data into three links: to the first link (i.e. a link having a larger DS than the amount of data in the PDCP buffer), the whole data in the buffer are forwarded, while the second and the third links (which indicated a smaller DS than the amount of data in the PDCP buffer) are provided with split data so that each of these links only gets a corresponding part of the whole data. The data in PDCP buffer is considered to be a sequence of PDCP protocol data units (PDUs) and the data may be split at boundaries of PDCP PDUs (i.e. PDCP PDU is not segmented) or at any arbitrary point (i.e. PDCP PDU may be segmented). In the case when PDCP PDU is segmented, the first segment and the second segment of the PDCP PDU duplicate are transmitted over the second and the third link respectively, and a relation to be considered for fulfilling the reliability may have the form P_x_1*(1−(1−P_x_2)*(1−P_x_3))<reliability requirement. In the case when PDCP PDU is not segmented, some of the PDCP PDU duplicates are transmitted over the second link while other PDCP PDU duplicates are transmitted over the third link, the relation to be considered for fulfilling the reliability is P_x_1*max (P_x_2, P_x_3)<reliability requirement.

According to some examples of embodiments, for example in case MCG PDCP determines to split data into two or more links, the size of PDCP SDU is taken into account if segmentation is not supported by PDCP. In this case, MCG/SCG MAC may be configured with the maximum size of PDCP SDU or minimum size of DS so that the offered DS in the assistance information is larger than at least one PDCP SDU. Then, according to some examples of embodiments, the MCG PDCP determines to split the data with the granularity of PDCP SDU into multiple links. Alternatively, according to some examples of embodiments, in case the size of PDCP SDU is not predictable and potentially very large, PDCP has to be configured to support a segmentation function in order to support data split.

Furthermore, according to some examples of embodiments, the packet duplication control element or function like the MCG PDCP determines a transmission sequence of different link(s) in time domain. For example, the packet duplication control element or function indicates that the link having the best P_x shall transmit the forwarded data without any delay while other links shall transmit the forwarded data in the next 1ls. In case the parameter D_x/D_y is indicated in the assistance information, the determination of a transmission in the next TTIs takes also into account the D_x/D_y so that the latency requirement is still possible to be met.

Moreover, according to some examples of embodiments, in case the packet duplication control element or function determines that a probability or a combined probability as indicated by the assistance information, such as P_x1*P_x_2, is significantly lower than is a required reliability (i.e. P_x1*P_x2<<P_required), then the packet duplication control element or function (i.e. the MCG PDCP) includes the assistance information probabilities adjusted by an offset, or the assistance information may include an offset itself, provided that (P_x_1+offset_1)*(P_x_2+offset_2) <P_required. By means of this offset, it is possible to indicate to the transmission control element or function, e.g. the MCG/SCG MAC, that the target probability is relaxed because of data duplication. In other words, an offset may be used to allow the packet duplication control element or function (MCG PDCP) to relax the reliability target that the MCG/SCG MAC needs to achieve. As an illustrative example, the following may be assumed: when three transmission control elements or functions (e.g. three SCG MACs) send assistant information with a value of P=0.1%, but the reliability target is 99.999% (PER=0.00001), the packet duplication control element or function may decide to duplicate the data to three MACs. In this case, one MAC may be informed to use the reported reliability target (i.e. 0.1%), but the other two MACs may be informed to use the reliability target supplemented with the offset (e.g. 1%=0.1%+offset). In total, the reliability target is then achieved by a transmission considering the three MAC entities.

After completing the packet duplication decision, the MCG PDCP indicates to the MCG/SCG MACs corresponding transmission control information, for example in a DL UP header of GTP-U over Xn interface.

For example, the MCG PDCP indicates whether duplication of the same data on one or more other link is performed or not. Furthermore, in order to assist a coordinated HARQ transmission among the duplicated links, the MCG PDCP may also indicate a data ID for the duplicated data to the different links.

For example, in case of using the coordinated HARQ transmissions among multiple transmission control elements or functions, such as different MCG/SCG MAC entities, which is indicated by the MCG PDCP in the transmission control information, such a data ID is provided e.g. by using the least significant bits of a PDCP packet sequence number in order to identify a HARQ process ID to be used for the transmission.

In another example, the data ID is provided by a short sequence number (SN) or HARQ process ID. In case of using the short SN (e.g. 1 to 3 bits), the SN may be included, for example, in one of DCI or MAC PDU header. Thus, the UE is able to reflect the SN in an ACK/NACK feedback to indicate which data is acknowledged (explained below). On the other hand, in case a HARQ process ID is used, some HARQ process ID are to be reserved for such a coordinated HARQ transmission so that it is ensured that the MAC entities do not use the same HARQ process ID for respective other data transmissions than the duplicated data.

Moreover, the MCG PDCP can also indicate a timing when the corresponding MAC entity has to transmit the forwarded data (i.e. case the MCG PDCP determines that the duplicated data in multiple links are to be transmitted in different timings).

Moreover, in case the assistance information being received by the packet duplication control element or function provides a list of P_x, the packet duplication control element or function (e.g. the MCG PDCP) indicates the target P_x which is the value the link should achieve for transmission of the forwarded data. According to further examples of embodiments, the probability is adjusted by an offset (as discussed above).

On the other hand, the transmission control element or function (e.g. MCG/SCG MAC), upon receiving the transmission control information, e.g. by getting the DL UP data over Xn, determines how to schedule the data transmission, based on header information of DL UP data, for example. Specifically, in case it is not indicated that duplication of the same data into other links is done, HARQ on the specific link is enabled so as to achieve the reliability requirement in the latency budget. On the other hand, in case duplication of the same data in other links is indicated, the transmission control element or function determines as to whether the HARQ is needed or not for this specific link. This is based, for example, on the indicated P_x in the assistance information; in case the indicated P_x in the assistance information is the expected probability of the first transmission, it is decided that HARQ for this link is not required. In this case, the reliability requirement is assumed to be achieved by retransmission or duplication in other links.

According to some further examples of embodiments, the packet duplication control element or function (e.g. the MCG PDCP) indicates that data transmission by a specific transmission control element or function (e.g. a specific SCG MAC) is to be performed in following TTIs; that is, this specific transmission control element or function is not used for the first transmission. In this case, this specific transmission control element or function (SCG MAC entity) expects a HARQ feedback from the UE for the duplicated data transmission via other links. The transmission of the duplicated data is not conducted in case an HARQ ACK for an earlier transmission via another link (i.e. the link used for the first transmission, for example) is received. For this purpose, the transmission control element or function which is not used for the first transmission conducts a processing for allowing the UE to give HARQ feedback in UL. Specifically, for example, the corresponding MAC entity (or entities) for which the delayed DL data transmission is set to give a small UL grant for the UE to send HARQ ACK/NACK based on the same data received from another link. In such coordinated HARQ transmission, the data ID indicated by the packet duplication control element or function (MCG PDCP) as discussed above is used to identify which data is acknowledged.

In other words, the UE provides a HARQ feedback concerning the successful or unsuccessful reception of data via one link to the transmission control element or function being responsible for another link in order to indicate whether retransmission is required or not. Thus, a corresponding MCG/SCG MAC scheduled for retransmission of the duplicated packets can start or stop HARQ processing. That is, ACK/NACK is not only given to the transmission control element or function of the link via which the data are received (or not received correctly), but also to the transmission control element or function of other link(s) being indicated to the UE. That is, the UE is configured, for example, to transmit ACK/NACK on all the radio legs that the duplication data are planned to be transmitted. In order to be able to allocate the received ACK correctly, the data ID is indicated together with ACK/NACK by the UE. It is to be noted that the resource allocated to the UE to transmit, for example, the ACK/NACK can be variably set; for example, the same or different resources across MCG and SCG can be allocated.

Figure 3:
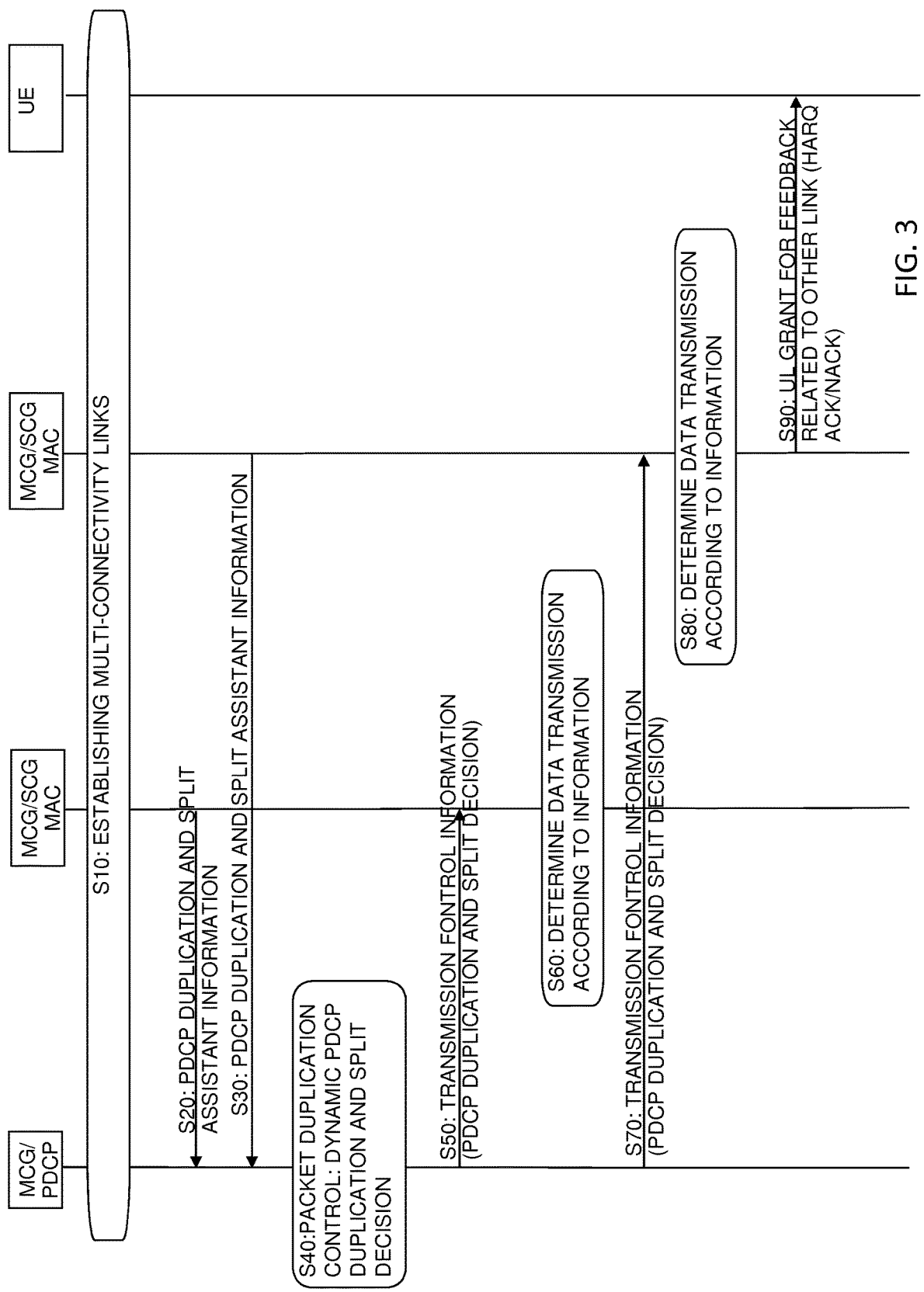
FIG. 3 shows a signaling diagram illustrating a packet duplication control process according to some examples of embodiments.

FIG. 3 shows a signaling diagram illustrating a packet duplication control process according to some examples of embodiments. In detail, FIG. 3 is related to an implementation example based on FIG. 1, i.e. the packet duplication control element or function is provided by MCG PDCP, and the transmission control elements or functions are provided by MCG/SCG MAC entities, wherein the assistance information and transmission control information are provided over Xn interface, for example.

In S10, a multi-connectivity communication is established by providing corresponding links between UE 10 and MCG 50 and SCG 60, 70, for example. According to some examples of embodiments, the multi-connectivity is established and configured based on RSRP type of measurement and controlled by RRC signaling.

In S20 and S30, the transmission control elements and functions involved in the multi-connectivity communication, e.g. MACs in MCG 50, SCG 60 and SCG 70, send the assistance information to the packet duplication control element or function, e.g. the PDCP in MCG 50.

In S40, the packet duplication control element or function (PDCP in MCG 50) conducts a processing for packet duplication control. Specifically, a decision regarding dynamic PDCP duplication and split as discussed above is made.

In S50 and S70, the packet duplication control element or function (PDCP in MCG 50) sends the decision regarding dynamic PDCP duplication and split as the transmission control information to the transmission control elements or functions, i.e. MACs in MCG 50, SCG 60 and SCG 70. The transmission control information may be sent, for example, to each transmission control element or function involved in the multi-connectivity communication (and from which the assistance information is received) or only to those transmission control elements or functions involved in the transmission of the duplicated data (i.e. those transmission control elements or functions being related to selected links).

In S60 and S90, respectively, the transmission control information is processed in the corresponding transmission control element or function, e.g. MACs in MCG 50 and SCG 60. For example, in connection with S60, in the transmission control element or function related to the link being used as the link for the first transmission of the data, it is determined that a specific HARQ related processing, such as a coordinated HARQ operation with another link is not required. For example, according to examples of embodiments, it is determined that no HARQ processing related to a coordinated HARQ operation with another link is to be prepared, or that only reception of HARQ feedback from UE regarding another link without retransmission processing is to be prepared, or that feedback provided by UE is used for a processing for tracking the performance of a wireless channel in connection with CSI reports, or the like. On the other hand, in connection with S80, another transmission control element or function related to the link being not used as the link for the first transmission of the data, it is determined that HARQ processing related to a coordinated HARQ operation with another link is to be prepared. For this purpose, an UL HARQ ACK/NACK transmission from the UE is scheduled, e.g. according to timing information received in the transmission control information, and data transmission of the duplicated data is scheduled for the event that NACK is received. Furthermore, in S90, an UL grant for HARQ feedback from the UE regarding the transmission of the data via the other link is sent to the UE, so as to indicate to the UE that ACK/NACK is to be sent to the other transmission control element or function as well.

By means of this processing, among the established multiple links, the packet duplication and split can be controlled more dynamically by using the above discussed interactions between involved PDCP and MAC entities.

It is to be noted that the above discussed dynamic packet duplication control such as the PDCP duplication-and-split control can be configured either during the establishment of multi-connectivity links or during configuration of radio bearer/logical channel for an specific application, such as URLLC. Furthermore, the coordination between the packet duplication control element or function (e.g. PDCP) and the transmission control elements or functions (e.g. MAC entities) can also be UE specific or bearer specific.

It is to be noted that the network elements providing the transmission control element or function can be varying. For example, the packet duplication control element or function can be in the same element like a transmission control element or function, e.g. in the MCG (i.e. MCG/PDCP and MCG/MAC), or the transmission control elements or functions are located in different network elements (e.g. only SCG/MAC are used while PDCP is in MCG). Alternatively, a centralized network node or server is used a control function which receives the assistance information from distributed units, determines whether duplication should be applied and configures a PDCP entity and possibly other protocol entities under PDCP to provide corresponding transmission control information. Furthermore, the link used or the first transmission is not limited to the MCG link (if present), but the MCG link may also be used for retransmission of the duplicated data.

Figure 4:
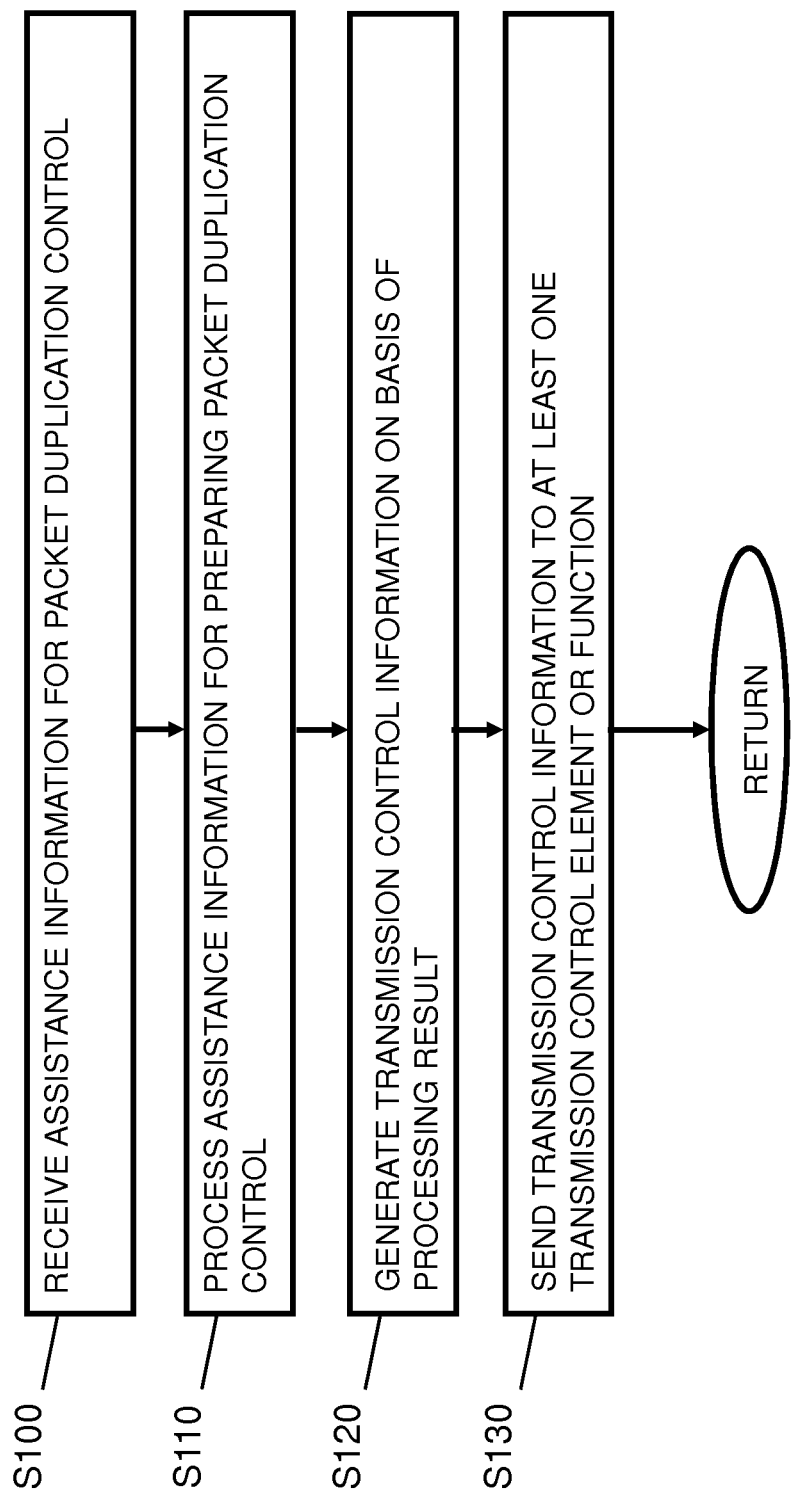
FIG. 4 shows a flow chart of a processing conducted in a packet duplication control element or function according to some examples of embodiments.

FIG. 4 shows a flow chart of a processing conducted in a packet duplication control element or function according to some examples of embodiments. Specifically, the example according to FIG. 4 is related to a procedure conducted by a packet duplication control element or function, such as the PDCP entity of MCG 50 as shown in connection with FIG. 1.

In S100, assistance information indicating communication conditions of at least one communication link of an established multi-connectivity communication between a communication element (e.g. UE 10) and at least two communication network access points (e.g. gNBs 20, 21, 22) are received.

According to some examples of embodiments, the assistance information comprises at least one of an indication of an estimated probability of an erroneous transmission via the at least one communication link of the established multi-connectivity communication (e.g. P_x), an indication of an estimated probability of a successful transmission via the at least one communication link of the established multi-connectivity communication, an indication of an estimated probability of an erroneous transmission of a given data amount via the at least one communication link of the established multi-connectivity communication (e.g. P_x, DS_x), an indication of an estimated probability of a successful transmission of a given data amount via the at least one communication link of the established multi-connectivity communication, an indication of an estimated probability of an erroneous transmission of a given data amount within a predetermined time period via the at least one communication link of the established multi-connectivity communication (e.g. P_x, DS_x, D_x), and an indication of an estimated probability of a successful transmission of a given data amount within a predetermined time period via the at least one communication link of the established multi-connectivity communication. Furthermore, according to some examples of embodiments, the assistance information may also include an estimated cost associated with e.g. (P_x), (P_x, DS_x) or (P_x, DS_x, D_x), wherein the estimated cost may represent a portion of wireless channel capacity required corresponding to an estimated probability of erroneous transmission or a portion of currently unused communication channel capacity.

In S110, the assistance information are processed for preparing a packet duplication control wherein, in the packet duplication control, data to be communicated via at least one communication link of the established multi-connectivity communication are duplicated for being transmittable via another communication link of the established multi-connectivity communication.

According to some examples of embodiments, when the assistance information for preparing the packet duplication control is processed, it is determined whether or not a packet duplication is to be conducted. In case it is determined to conduct a packet duplication, at least two links of the multi-connectivity communication is selected to be used for a packet duplication process. Furthermore, a timing for transmitting the duplicated packet via at least one of the selected at least two links of the multi-connectivity communication is determined. Furthermore, it is decided whether a coordination between different links selected to be used for a packet duplication process regarding an automatic repeat processing is to be conducted.

For example according to some further examples of embodiments, the at least two links of the multi-connectivity communication to be used for a packet duplication process are selected on the basis of comparing values of an estimated probability of an erroneous transmission or estimated probability of a successful transmission between links of the multi-connectivity communication with each other or a predetermined threshold, wherein information about at least one of data packet size and time budget is considered, when available, in the selection of the at least two links. That is, the respective parameters used for the selection of the links may be compared with each other so as to find out, for example, the best suited two, three etc. links, or with a predetermined threshold (e.g. a minimum requirement of conditions to be achieved by a selected link).

Furthermore, according to some examples of embodiments, an offset value is determined for indicating a reliability target to be achieved for at least one of the at least two links of the multi-connectivity communication.

In S120, transmission control information is generated on the basis of the result of the processing of the assistance information. The transmission control information indicates settings for a packet duplication process in the established multi-connectivity communication.

According to some examples of embodiments, when the transmission control information is generated on the basis of the result of the processing of the assistance information, it is possible to provide, as settings for the packet duplication process in the established multi-connectivity communication, at least one of an indication of whether a packet duplication processing is conducted via another link of the multi-connectivity communication, an indication to apply a specified timing for transmitting the duplicated packet via the link of the multi-connectivity communication, an indication to conduct a coordination with at least one other link selected used for the packet duplication process regarding an automatic repeat processing, an indication of a reliability target to be achieved for the link of the multi-connectivity communication, and an indication of an offset value related to a reliability target to be achieved for the link of the multi-connectivity communication.

In S130, the transmission control information is sent to at least one transmission control element or function being involved in the packet duplication process in the established multi-connectivity communication.

According to some examples of embodiments, the packet duplication control element or function is a central network element connected to or a part of a packet data convergence protocol entity of a master network node of a cellular communication network capable of participating in a multi-connectivity communication with at least one communication element, wherein the communication element is a terminal device or user equipment communicating in the cellular communication network, and the at least one a transmission control element or function being involved in the packet duplication process in the established multi-connectivity communication comprises at least one of a media access control entity of the master network node or a media access control entity of at least one secondary network node in the multi-connectivity communication.

Figure 5:
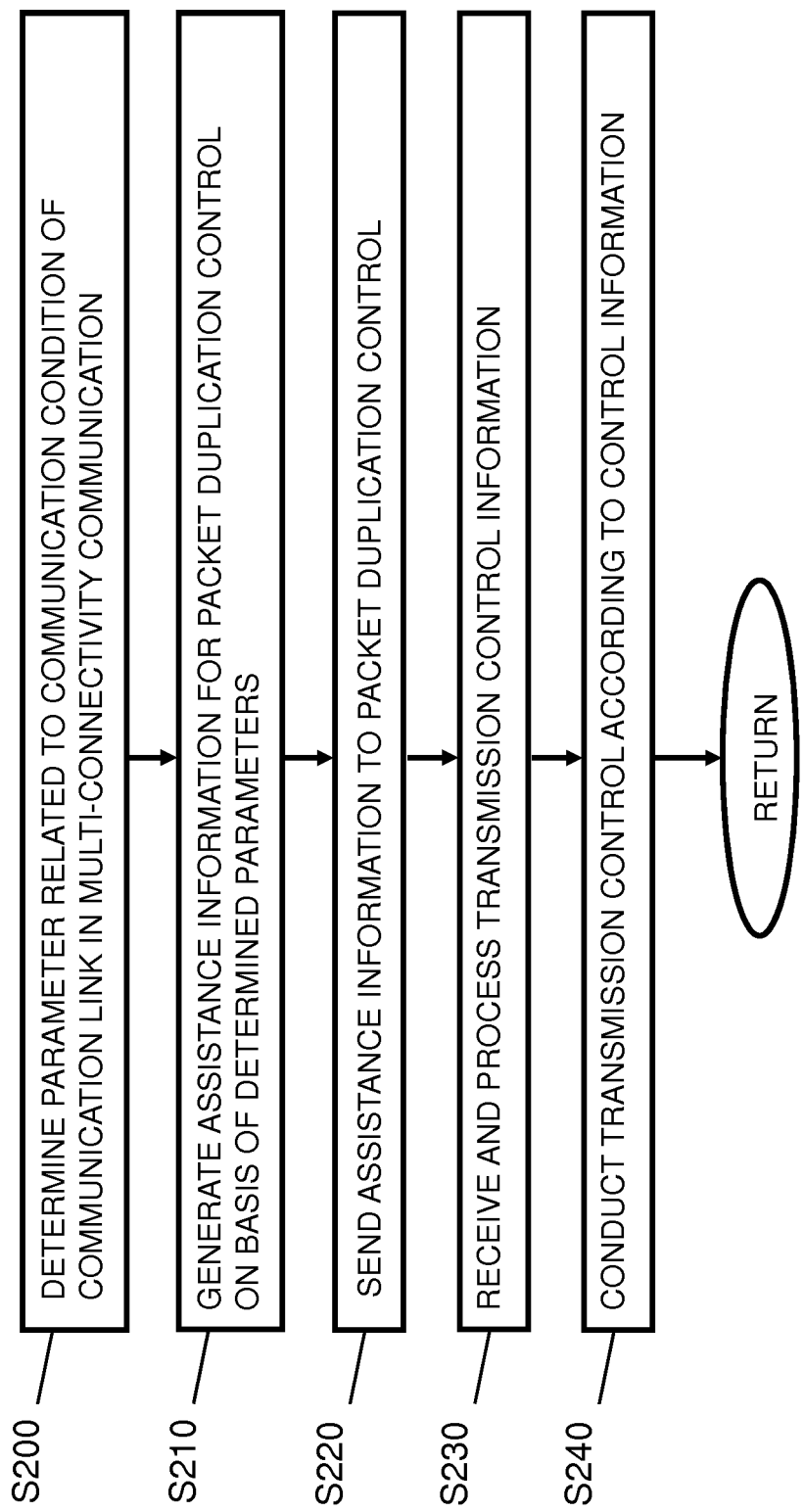
FIG. 5 shows a flow chart of a processing conducted in a transmission control element or function according to some examples of embodiments.

FIG. 5 shows a flow chart of a processing conducted in a transmission control element or function according to some examples of embodiments. Specifically, the example according to FIG. 5 is related to a procedure conducted by a transmission control element or function, such as the MAC of SCG 60, as shown in connection with FIG. 1.

In S200, communication conditions of at least one communication link of an established multi-connectivity communication between a communication element and at least two communication network access points are determined.

For example, according to some examples of embodiments, the communication conditions of the at least one communication link of the established multi-connectivity communication are determined by calculating an estimated probability of an erroneous transmission via the at least one communication link or an estimated probability of a successful transmission via the at least one communication link on the basis of a connection quality with the communication element, by estimating a data size that can be provided within a specified time period on the basis of a used modulation and coding scheme and an amount of available resources for the communication element, and by determining a time budget for achieving a specific transmission performance.

In S210, assistance information is generated on the basis of the determined communication conditions.

According to some examples of embodiments, the assistance information comprises at least one of an indication of an estimated probability of an erroneous transmission via the at least one communication link of the established multi-connectivity communication (e.g. P_x), an indication of an estimated probability of a successful transmission via the at least one communication link of the established multi-connectivity communication, an indication of an estimated probability of an erroneous transmission of a given data amount via the at least one communication link of the established multi-connectivity communication (e.g. P_x, DS_x), an indication of an estimated probability of a successful transmission of a given data amount via the at least one communication link of the established multi-connectivity communication, an indication of an estimated probability of an erroneous transmission of a given data amount within a predetermined time period via the at least one communication link of the established multi-connectivity communication (e.g. P_x, DS_x, D_x), and an indication of an estimated probability of a successful transmission of a given data amount within a predetermined time period via the at least one communication link of the established multi-connectivity communication. Furthermore, according to some examples of embodiments, the assistance information may also include an estimated cost associated with e.g. (P_x), (P_x, DS_x) or (P_x, DS_x, D_x), wherein the estimated cost may represent a portion of wireless channel capacity required corresponding to an estimated probability of erroneous transmission or a portion of currently unused communication channel capacity.

In S220, the assistance information is sent to a packet duplication control element or function.

According to some examples of embodiments, it may be decided to limit (i.e. stop) sending of the assistance information to the packet duplication control element or function on the basis of a check as to whether or not current communication conditions are within a predefined range allowing to fulfill a previously received setting for a packet duplication control.

In S230, transmission control information indicating settings for a packet duplication control in the established multi-connectivity communication is received from the packet duplication control element or function and processed.

According to some examples of embodiments, when processing the transmission control information, it is determined whether a packet duplication process is conducted via another link of the multi-connectivity communication, an automatic repeat processing for a packet duplication process via the link of the multi-connectivity communication is enabled or disabled, on the basis of the determination regarding packet duplication process via another link, a transmission in the packet duplication process at a specified timing for transmitting the duplicated packet via the link of the multi-connectivity communication is prepared, a coordination with at least one other link used for the packet duplication process regarding an automatic repeat processing is prepared, and a reliability target to be achieved for the link of the multi-connectivity communication is determined.

According to some examples of embodiments, when the transmission control information is processed, for preparing the coordination with at least one other link used for the packet duplication process regarding an automatic repeat processing, an uplink grant for the communication element is given to transmit an indication regarding acknowledgment or negative acknowledgment of reception via the other link of data corresponding to the duplicated data.

In S240, a transmission control for a packet duplication processing in the established multi-connectivity communication is conducted in accordance with the transmission control information.

According to some examples of embodiments, the packet duplication control element or function is a central network element connected to or a part of a packet data convergence protocol entity of a master network node of a cellular communication network capable of participating in a multi-connectivity communication with at least one communication element, wherein the communication element is a terminal device or user equipment communicating in the cellular communication network. Furthermore, the transmission control element or function being involved in the packet duplication process in the established multi-connectivity communication comprises at least one of a media access control entity of the master network node or a media access control entity of at least one secondary network node in the multi-connectivity communication.

Figure 8:
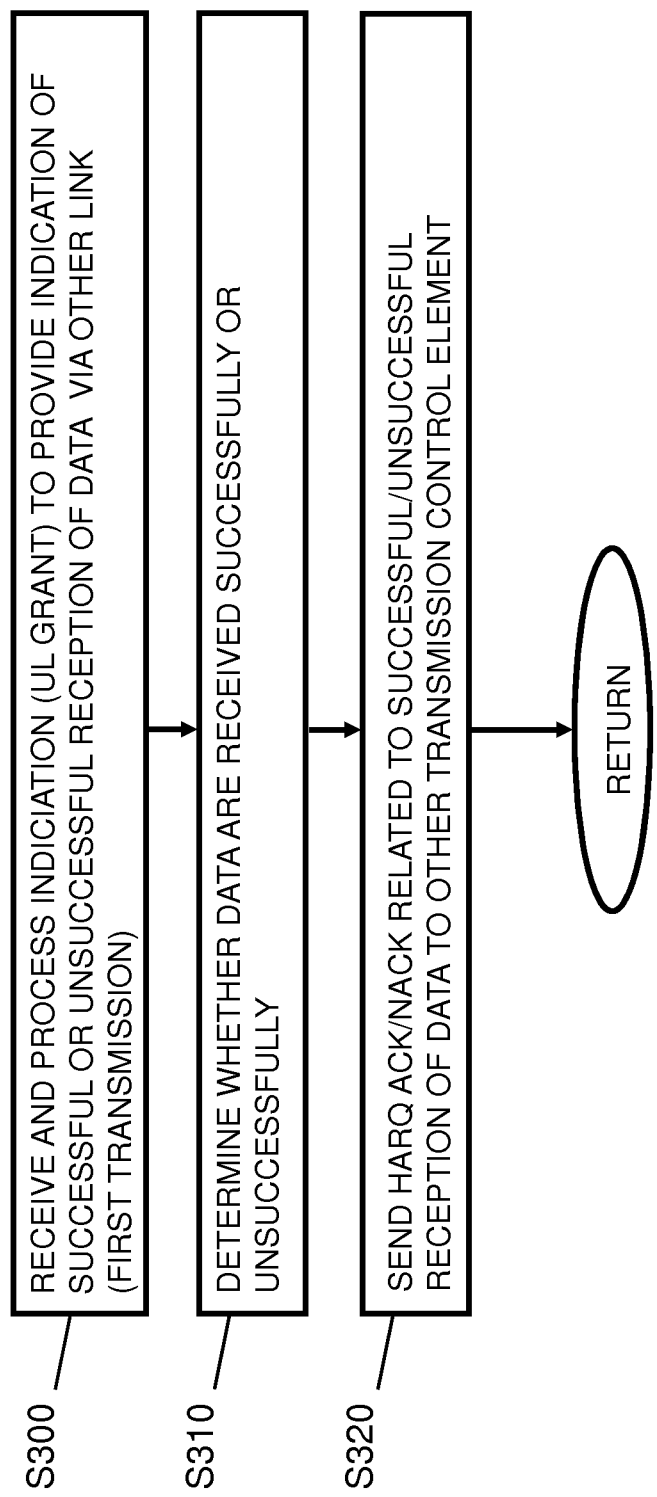
FIG. 8 shows a flow chart of a processing conducted in a packet duplication control element or function according to some examples of embodiments.

FIG. 8 shows a flow chart of a processing conducted in a communication element according to some examples of embodiments. Specifically, the example according to FIG. 8 is related to a procedure conducted by a communication element, such as the UE 10, as shown in connection with FIG. 1.

In S300, an indication to provide an information about a successful or unsuccessful reception of data via at least one first communication link of an established multi-connectivity communication between the communication element and at least two communication network access points to a transmission control element or function of at least one other link of the established multi-connectivity communication is received and processed.

According to some examples of embodiments, the indication is an UL grant provided by the transmission control element or function of the at least one other link of the established multi-connectivity communication.

In S310 it is determined whether the data reception via the at least one first communication link is successfully completed or not.

In S320, based on the result of S310, an acknowledgement or negative acknowledgement indication reflecting the successful or unsuccessful reception of the data is transmitted to at least one transmission control element or function of another link of the established multi-connectivity communication.

According to some examples of embodiments, a data ID of the data being successfully or unsuccessfully received is provided with the acknowledgement or negative acknowledgement indication sent to the transmission control element or function. For example, as the identification of the data being successfully or unsuccessfully received with the acknowledgement or negative acknowledgment indication sent to the transmission control element or function, one of a set of least bits of a sequence number related to a transmitted data packet (PDCP SN), a predetermined sequence number (SN) or a process ID related to an automatic repeat processing (e.g. HARQ process ID) may be used.

Moreover, according to some examples of embodiments, the communication element is a terminal device or user equipment capable of participating in a multi-connectivity communication in a cellular communication network. Furthermore, the at least one transmission control element or function comprises at least one of a media access control entity of a master network node or a media access control entity of at least one secondary network node in the multi-connectivity communication.

Figure 6:
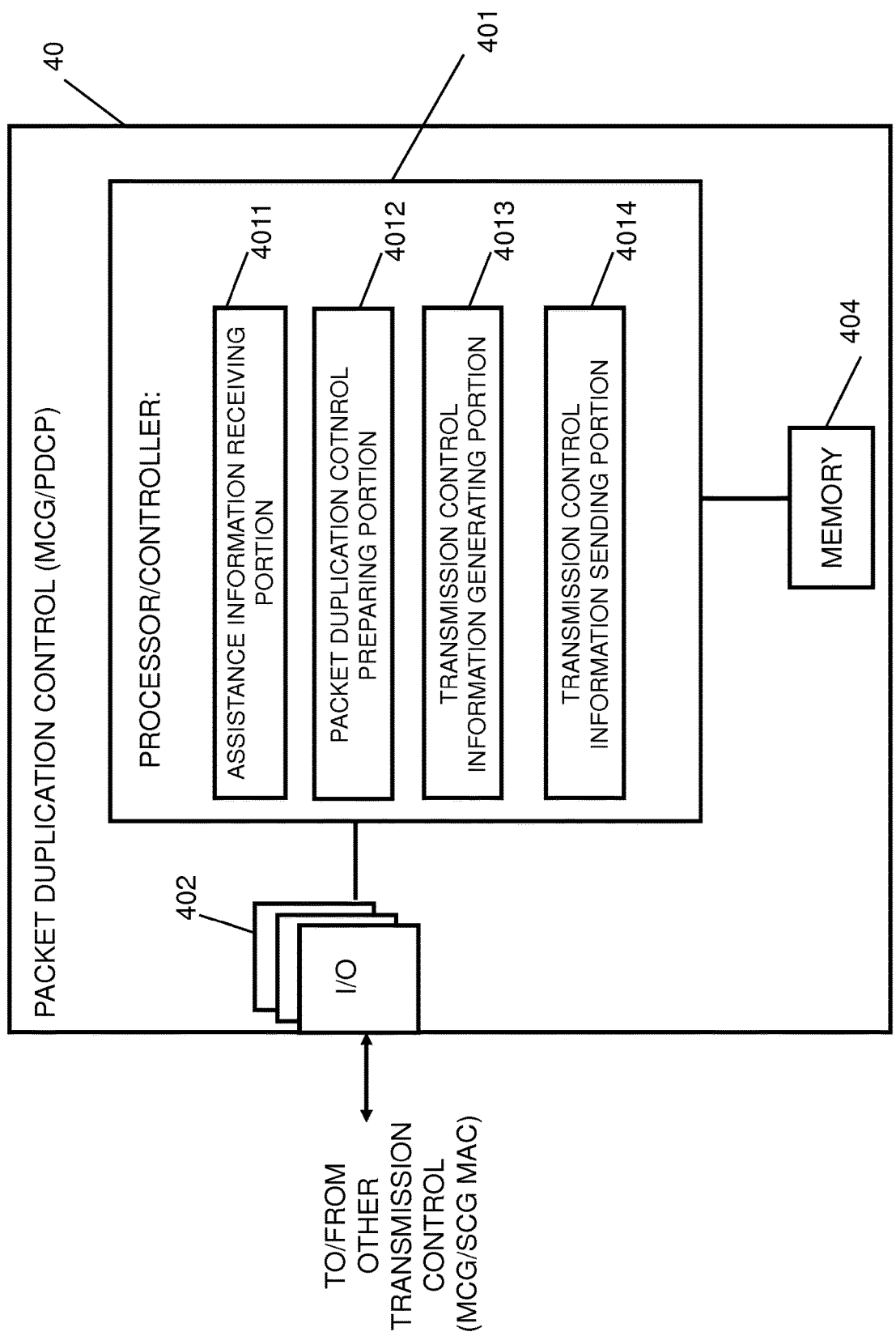
FIG. 6 shows a diagram of a network element or function acting as a packet duplication control element or function according to some examples of embodiments.

FIG. 6 shows a diagram of a network element or function acting as a packet duplication control element or function according to some examples of embodiments, e.g. as central network element 40 or MCG control element 50, which is configured to implement a procedure for a packet duplication control processing as described in connection with some of the examples of embodiments. It is to be noted that the network element or function, like the central network element 40 of FIG. 1 or the MCG control element 50 of FIG. 2, may include further elements or functions besides those described herein below. Furthermore, even though reference is made to a network element or function, the element or function may be also another device or function having a similar task, such as a chipset, a chip, a module, an application etc., which can also be part of a network element or attached as a separate element to a network element, or the like. It should be understood that each block and any combination thereof may be implemented by various means or their combinations, such as hardware, software, firmware, one or more processors and/or circuitry.

The network element 40 shown in FIG. 6 may include a processing circuitry, a processing function, a control unit or a processor 401, such as a CPU or the like, which is suitable for executing instructions given by programs or the like related to the control procedure. The processor 401 may include one or more processing portions or functions dedicated to specific processing as described below, or the processing may be run in a single processor or processing function. Portions for executing such specific processing may be also provided as discrete elements or within one or more further processors, processing functions or processing portions, such as in one physical processor like a CPU or in one or more physical or virtual entities, for example. Reference sign 402 denotes input/output (I/O) units or functions (interfaces) connected to the processor or processing function 401. The I/O units 402 may be used for communicating with the transmission control elements or functions and/or other entities or functions, as described in connection with FIG. 1, for example. The I/O units 402 may be a combined unit including communication equipment towards several entities, or may include a distributed structure with a plurality of different interfaces for different entities. Reference sign 404 denotes a memory usable, for example, for storing data and programs to be executed by the processor or processing function 401 and/or as a working storage of the processor or processing function 401. It is to be noted that the memory 404 may be implemented by using one or more memory portions of the same or different type of memory.

The processor or processing function 401 is configured to execute processing related to the above described procedure for packet duplication control. In particular, the processor or processing circuitry or function 401 includes one or more of the following sub-portions. Sub-portion 4011 is a processing portion which is usable as a portion for receiving assistance information. The portion 4011 may be configured to perform processing according to S100 of FIG. 4. Furthermore, the processor or processing circuitry or function 401 may include a sub-portion 4012 usable as a portion for preparing a packet duplication control. The portion 4012 may be configured to perform a processing according to S110 of FIG. 4. In addition, the processor or processing circuitry or function 401 may include a sub-portion 4013 usable as a portion for generating transmission control information. The portion 4013 may be configured to perform a processing according to S120 of FIG. 4. Moreover, the processor or processing circuitry or function 401 may include a sub-portion 4014 usable as a portion for sending the transmission control information. The portion 4014 may be configured to perform a processing according to S140 of FIG. 4.

Figure 7:
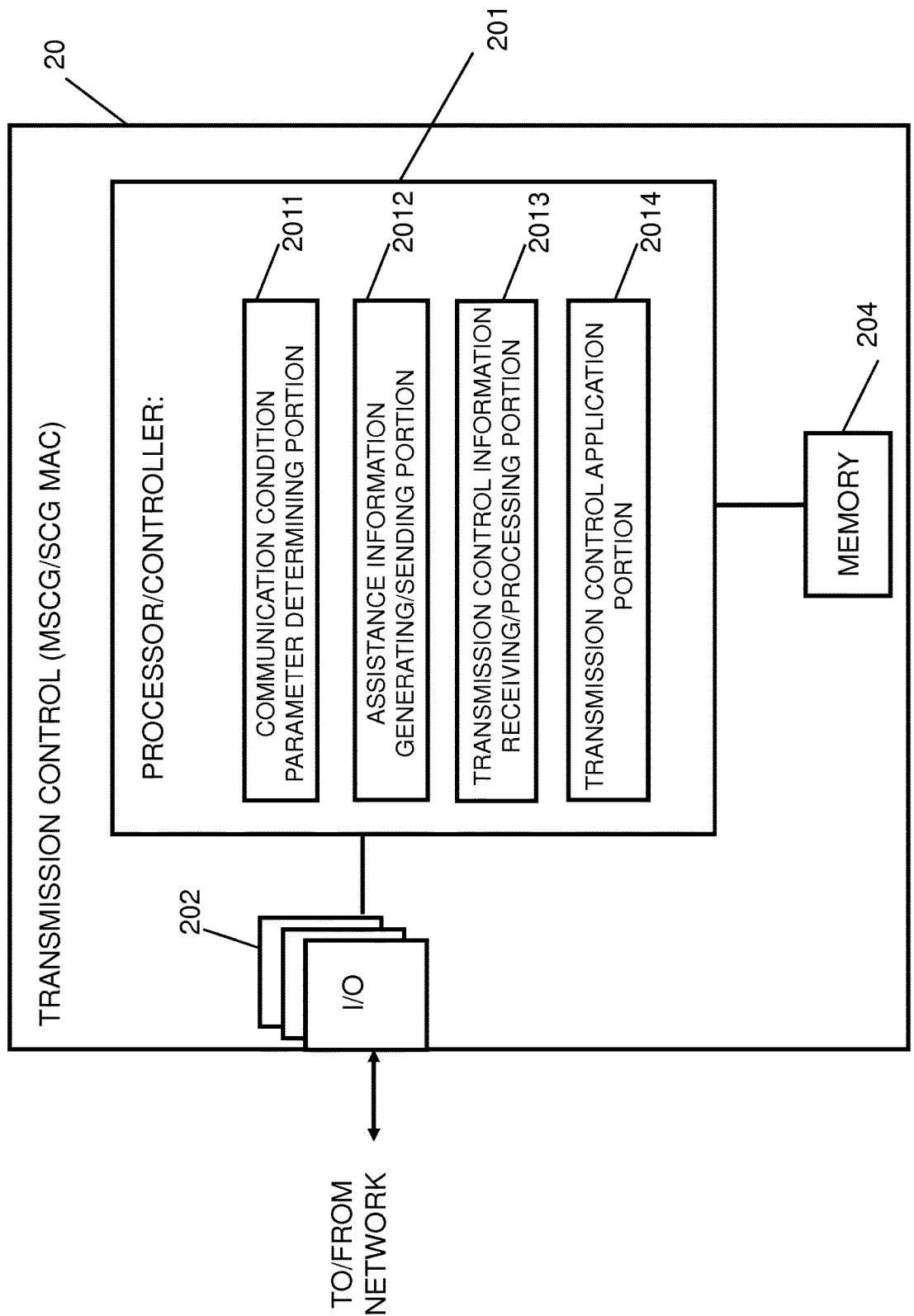
FIG. 7 shows a diagram of a network element or function acting as a transmission control element according to some examples of embodiments.

FIG. 7 shows a diagram of a network element or function acting as a transmission control element according to some examples of embodiments, e.g. as MCG/SCG MAC entity in gNB 20, which is configured to implement a procedure for a packet duplication control processing as described in connection with some of the examples of embodiments. It is to be noted that the network element or function, like the gNB 20 of FIG. 1, may include further elements or functions besides those described herein below. Furthermore, even though reference is made to a gNB as transmission control element or function, the element or function may be also another device or function having a similar task, such as a chipset, a chip, a module, an application etc., which can also be part of a communication network element or attached as a separate element to a communication network element, or the like. It should be understood that each block and any combination thereof may be implemented by various means or their combinations, such as hardware, software, firmware, one or more processors and/or circuitry.

The gNB 20 shown in FIG. 7 may include a processing circuitry, a processing function, a control unit or a processor 201, such as a CPU or the like, which is suitable for executing instructions given by programs or the like related to the control procedure. The processor 201 may include one or more processing portions or functions dedicated to specific processing as described below, or the processing may be run in a single processor or processing function. Portions for executing such specific processing may be also provided as discrete elements or within one or more further processors, processing functions or processing portions, such as in one physical processor like a CPU or in one or more physical or virtual entities, for example. Reference sign 202 denotes input/output (I/O) units or functions (interfaces) connected to the processor or processing function 201. The I/O units 202 may be used for communicating with the communication network and/or other entities or functions, as described in connection with FIG. 1, for example. The I/O units 202 may be a combined unit including communication equipment towards several entities, or may include a distributed structure with a plurality of different interfaces for different entities. Reference sign 204 denotes a memory usable, for example, for storing data and programs to be executed by the processor or processing function 201 and/or as a working storage of the processor or processing function 201. It is to be noted that the memory 204 may be implemented by using one or more memory portions of the same or different type of memory.

The processor or processing function 201 is configured to execute processing related to the above described procedure for packet duplication control processing. In particular, the processor or processing circuitry or function 201 includes one or more of the following sub-portions. Sub-portion 2011 is a processing portion which is usable as a portion for determining communication condition parameters. The portion 2011 may be configured to perform processing according to S200 of FIG. 5. Furthermore, the processor or processing circuitry or function 201 may include a sub-portion 2012 usable as a portion for generating and sending assistance information. The portion 2012 may be configured to perform a processing according to S210 and S220 of FIG. 5. In addition, the processor or processing circuitry or function 201 may include a sub-portion 2013 usable as a portion for receiving and processing transmission control information. The portion 2013 may be configured to perform a processing according to S230 of FIG. 5. Furthermore, the processor or processing circuitry or function 201 may include a sub-portion 2014 usable as a portion for applying a transmission control. The portion 2014 may be configured to perform a processing according to S240 of FIG. 5.

Figure 9:
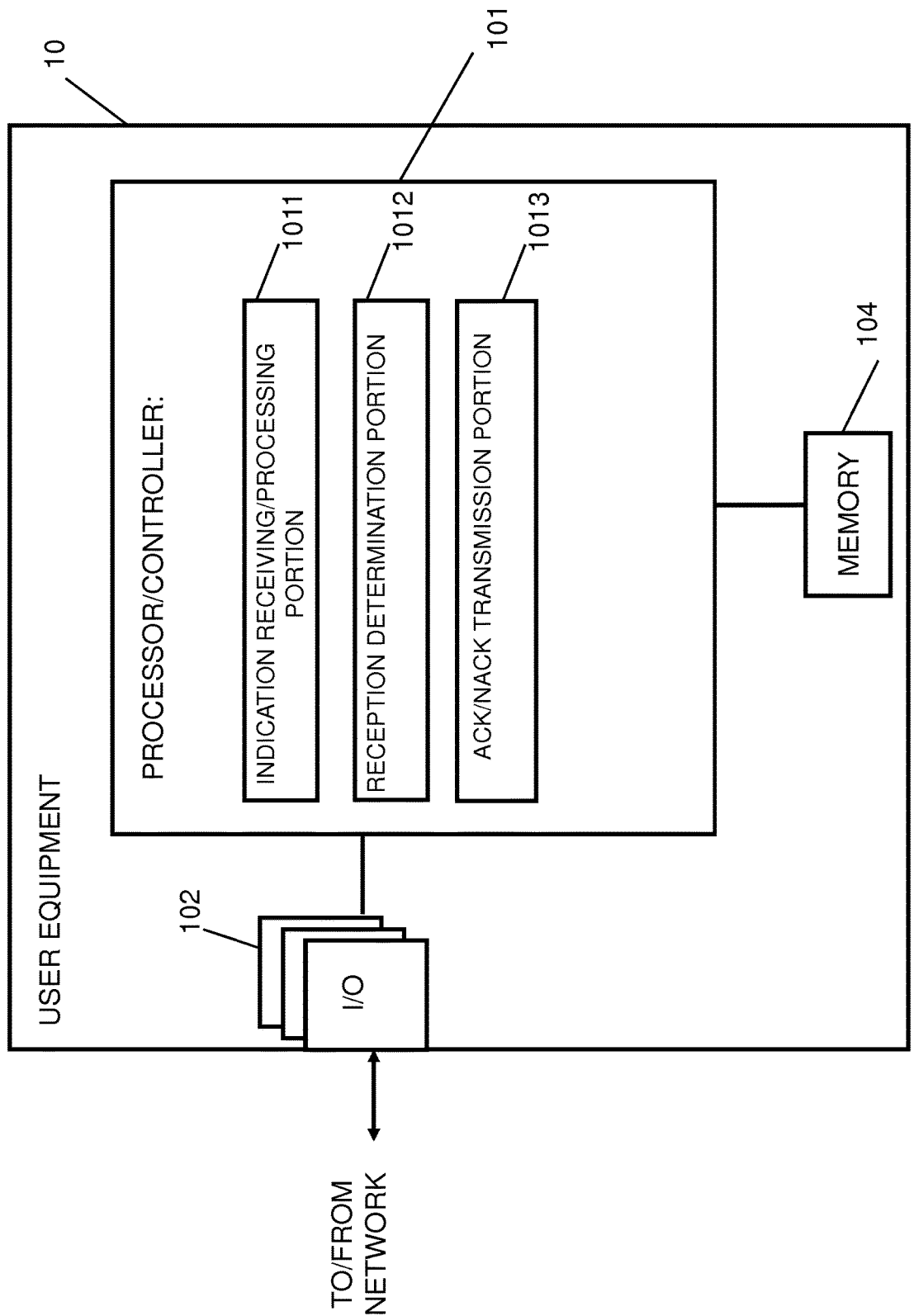
FIG. 9 shows a diagram of a network element or function acting as a transmission control element according to some examples of embodiments.

FIG. 9 shows a diagram of a network element or function acting as a communication element according to some examples of embodiments, e.g. as UE 10, which is configured to implement a procedure for a packet duplication control processing as described in connection with some of the examples of embodiments. It is to be noted that the communication element, like the UE 10 of FIG. 1, may include further elements or functions besides those described herein below. Furthermore, even though reference is made to a communication element, the element may be also another device or function having a similar task, such as a chipset, a chip, a module, an application etc., which can also be part of a network element or attached as a separate element to a network element, or the like. It should be understood that each block and any combination thereof may be implemented by various means or their combinations, such as hardware, software, firmware, one or more processors and/or circuitry.

The communication element 10 shown in FIG. 9 may include a processing circuitry, a processing function, a control unit or a processor 101, such as a CPU or the like, which is suitable for executing instructions given by programs or the like related to the control procedure. The processor 101 may include one or more processing portions or functions dedicated to specific processing as described below, or the processing may be run in a single processor or processing function. Portions for executing such specific processing may be also provided as discrete elements or within one or more further processors, processing functions or processing portions, such as in one physical processor like a CPU or in one or more physical or virtual entities, for example. Reference sign 102 denotes input/output (I/O) units or functions (interfaces) connected to the processor or processing function 101. The I/O units 102 may be used for communicating with the transmission control elements or functions and/or other entities or functions, as described in connection with FIG. 1, for example. The I/O units 102 may be a combined unit including communication equipment towards several entities, or may include a distributed structure with a plurality of different interfaces for different entities. Reference sign 104 denotes a memory usable, for example, for storing data and programs to be executed by the processor or processing function 101 and/or as a working storage of the processor or processing function 101. It is to be noted that the memory 104 may be implemented by using one or more memory portions of the same or different type of memory.

The processor or processing function 101 is configured to execute processing related to the above described procedure for packet duplication control. In particular, the processor or processing circuitry or function 101 includes one or more of the following sub-portions. Sub-portion 1011 is a processing portion which is usable as a portion for receiving and processing an indication. The portion 1011 may be configured to perform processing according to S300 of FIG. 8. Furthermore, the processor or processing circuitry or function 101 may include a sub-portion 1012 usable as a portion for determining a data reception. The portion 1012 may be configured to perform a processing according to S310 of FIG. 8. In addition, the processor or processing circuitry or function 101 may include a sub-portion 1013 usable as a portion for transmitting an ACK/NACK indication. The portion 1013 may be configured to perform a processing according to S320 of FIG. 8.

It is to be noted that examples of embodiments of the invention are applicable to various different network configurations. In other words, the example shown in FIG. 1, which is used as a basis for the above discussed examples, is only illustrative and does not limit the present invention in any way. That is, additional further existing and proposed new functionalities available in a corresponding operating environment may be used in connection with examples of embodiments of the invention based on the principles defined.

It is to be noted that the measures described in the present specification can be executed on top of common/general measures or communication procedures. Some of the measures described in the present specification can be applied separately, some in various combinations, or all measures can be combined in one procedure.

Furthermore, while examples of embodiments are discussed in connection with URLLC, the principles of the present invention can be applied also to other multi-connectivity scenarios where a certain reliability of the transmission needs to be guaranteed within certain delay/latency budget. For example, packet duplication control as discussed above can be used to improve reliability and robustness of wireless communication in case of eMBB in both non-stand-alone (LTE-5G dual connectivity) and stand-alone (5G dual/multi connectivity) deployments.

According to a further example of embodiments, there is provided, for example, an apparatus for use by a packet duplication control element or function, the apparatus comprising means configured to receive assistance information indicating communication conditions of at least one communication link of an established multi-connectivity communication between a communication element and at least two communication network access points, means configured to process the assistance information for preparing a packet duplication control wherein, in the packet duplication control, data to be communicated via at least one communication link of the established multi-connectivity communication are duplicated for being transmittable via another communication link of the established multi-connectivity communication, means configured to generate transmission control information on the basis of the result of the processing of the assistance information, the transmission control information indicating settings for a packet duplication process in the established multi-connectivity communication, and means configured to send the transmission control information to at least one transmission control element or function being involved in the packet duplication process in the established multi-connectivity communication.

Furthermore, according to some other examples of embodiments, the above defined apparatus may further comprise means for conducting at least one of the processing defined in the above described methods, for example a method according that described in connection with FIG. 4.

According to a further example of embodiments, there is provided, for example, an apparatus for use by a transmission control element or function, the apparatus comprising means configured to determine communication conditions of at least one communication link of an established multi-connectivity communication between a communication element and at least two communication network access points, means configured to generate assistance information on the basis of the determined communication conditions, means configured to send the assistance information to a packet duplication control element or function, means configured to receive, from the packet duplication control element or function, and process transmission control information indicating settings for a packet duplication control in the established multi-connectivity communication, wherein, in the packet duplication control, data to be communicated via at least one communication link of the established multi-connectivity communication are duplicated for being transmittable via another communication link of the established multi-connectivity communication, and means configured to conduct a transmission control for a packet duplication processing in the established multi-connectivity communication in accordance with the transmission control information.

Furthermore, according to some other examples of embodiments, the above defined apparatus may further comprise means for conducting at least one of the processing defined in the above described methods, for example a method according that described in connection with FIG. 5.

According to a further example of embodiments, there is provided, for example, an apparatus for use by a communication element, the apparatus comprising means configured to receive and process an indication to provide an information about a successful or unsuccessful reception of data via at least one first communication link of an established multi-connectivity communication between the communication element and at least two communication network access points to a transmission control element or function of at least one other link of the established multi-connectivity communication, means configured to determine whether the data reception via the at least one first communication link is successfully completed or not, and means configured to send an acknowledgement or negative acknowledgment indication reflecting the successful or unsuccessful reception of the data to at least one transmission control element or function of another link of the established multi-connectivity communication.

Furthermore, according to some other examples of embodiments, the above defined apparatus may further comprise means for conducting at least one of the processing defined in the above described methods, for example a method according that described in connection with FIG. 8.

It should be appreciated that an access technology via which traffic is transferred to and from an entity in the communication network may be any suitable present or future technology, such as WLAN (Wireless Local Access Network), WiMAX (Worldwide Interoperability for Microwave Access), LTE, LTE-A, 5G, Bluetooth, Infrared, and the like may be used; additionally, embodiments may also apply wired technologies, e.g. IP based access technologies like cable networks or fixed lines.

embodiments suitable to be implemented as software code or portions of it and being run using a processor or processing function are software code independent and can be specified using any known or future developed programming language, such as a high-level programming language, such as objective-C, C, C++, C#, Java, Python, Javascript, other scripting languages etc., or a low-level programming language, such as a machine language, or an assembler.

implementation of embodiments is hardware independent and may be implemented using any known or future developed hardware technology or any hybrids of these, such as a microprocessor or CPU (Central Processing Unit), MOS (Metal Oxide Semiconductor), CMOS (Complementary MOS), BiMOS (Bipolar MOS), BiCMOS (Bipolar CMOS), ECL (Emitter Coupled Logic), and/or TTL (Transistor-Transistor Logic).

embodiments may be implemented as individual devices, apparatuses, units, means or functions, or in a distributed fashion, for example, one or more processors or processing functions may be used or shared in the processing, or one or more processing sections or processing portions may be used and shared in the processing, wherein one physical processor or more than one physical processor may be used for implementing one or more processing portions dedicated to specific processing as described, an apparatus may be implemented by a semiconductor chip, a chipset, or a (hardware) module including such chip or chipset;

embodiments may also be implemented as any combination of hardware and software, such as ASIC (Application Specific IC (Integrated Circuit)) components, FPGA (Field-programmable Gate Arrays) or CPLD (Complex Programmable Logic Device) components or DSP (Digital Signal Processor) components.

embodiments may also be implemented as computer program products, including a computer usable medium having a computer readable program code embodied therein, the computer readable program code adapted to execute a process as described in embodiments, wherein the computer usable medium may be a non-transitory medium.

Although the present invention has been described herein before with reference to particular embodiments thereof, the present invention is not limited thereto and various modifications can be made thereto.

The invention claimed is:

1. An apparatus for use with a control element or function, the apparatus comprising
   at least one processing circuitry, and
   at least one non-transitory memory for storing instructions to be executed with the processing circuitry, wherein the at least one memory and the instructions are configured to, with the at least one processing circuitry, cause the apparatus at least:
      to receive assistance information indicating communication conditions of at least one communication link of an established multi-connectivity communication between a communication element and at least two communication network access points, wherein the assistance information comprises at least an indication of a cost corresponding to an estimated probability of a successful transmission of a given data amount via the at least one communication link of the established multi-connectivity communication, comprising at least one of:
         a portion of overall communication channel capacity, or
         a portion of currently unused communication channel capacity,
      to process the assistance information for preparing a packet duplication control wherein, in the packet duplication control, data to be communicated via the at least one communication link of the established multi-connectivity communication are duplicated for being transmittable via another communication link of the established multi-connectivity communication,
      to generate transmission control information on the basis of a result of the processing of the assistance information, the transmission control information indicating settings for a packet duplication process in the established multi-connectivity communication, and
      to send the transmission control information to at least one transmission control element or function being involved in the packet duplication process in the established multi-connectivity communication.

2. The apparatus according to claim 1, wherein the assistance information further comprises at least one of
   an indication of an estimated probability of an erroneous transmission via the at least one communication link of the established multi-connectivity communication,
   an indication of an estimated probability of a successful transmission via the at least one communication link of the established multi-connectivity communication, an indication of an estimated probability of an erroneous transmission of a given data amount via the at least one communication link of the established multi-connectivity communication, an indication of an estimated probability of a successful transmission of a given data amount via the at least one communication link of the established multi-connectivity communication, an indication of an estimated probability of an erroneous transmission of a given data amount within a predetermined time via the at least one communication link of the established multi-connectivity communication, an indication of an estimated probability of a successful transmission of a given data amount within a predetermined time via the at least one communication link of the established multi-connectivity communication, or an indication of a cost corresponding to an estimated probability of an erroneous transmission of a given data amount via the at least one communication link of the established multi-connectivity communication.

3. The apparatus according to claim 1, wherein the at least one memory and the instructions are further configured to, with the at least one processing circuitry, cause the apparatus at least, when processing the assistance information for preparing the packet duplication control, to determine whether or not a packet duplication is to be conducted, and in case it is determined to conduct the packet duplication, to select at least two links of the established multi-connectivity communication to be used for the packet duplication process, to determine a timing for transmitting a duplicated packet via a selected one of the at least two links of the established multi-connectivity communication, and to decide whether a coordination between different links selected to be used for a packet duplication process regarding an automatic repeat processing is to be conducted.

4. The apparatus according to claim 3, wherein the at least one memory and the instructions are further configured to, with the at least one processing circuitry, cause the apparatus at least to select the at least two links of the established multi-connectivity communication to be used for the packet duplication process on the basis of comparing at least values of an estimated probability of an erroneous transmission or estimated probability of a successful transmission between links of the established multi-connectivity communication with each other or a predetermined threshold, wherein information about at least one of data packet size or time budget is considered in the selection of the at least two links.

5. The apparatus according to claim 3, wherein the at least one memory and the instructions are further configured to, with the at least one processing circuitry, cause the apparatus at least to determine an offset value for indicating a reliability target to be achieved for at least one of the at least two links of the established multi-connectivity communication.

6. The apparatus according to claim 1, wherein the at least one memory and the instructions are further configured to, with the at least one processing circuitry, cause the apparatus at least, when generating the transmission control information on the basis of the result of the processing of the assistance information, to provide, as the settings for the packet duplication process in the established multi-connectivity communication, at least one of an indication of whether the packet duplication process is conducted via the another communication link of the established multi-connectivity communication, an indication to apply a specified timing for transmitting a duplicated packet via the another communication link of the established multi-connectivity communication, an indication to conduct a coordination with at least one other link selected for the packet duplication process regarding an automatic repeat processing, an indication of a reliability target to be achieved for the another communication link of the established multi-connectivity communication, or an indication of an offset value related to the reliability target to be achieved for the another communication link of the established multi-connectivity communication.

7. The apparatus according to claim 1, wherein the control element or function is a central network element connected to or a part of a packet data convergence protocol entity of a master network node of a cellular communication network capable of participating in a multi-connectivity communication with at least one communication element, wherein the communication element is a terminal device or user equipment communicating in the cellular communication network, and the at least one a transmission control element or function being involved in the packet duplication process in the established multi-connectivity communication comprises at least one of a media access control entity of the master network node or a media access control entity of at least one secondary network node in the multi-connectivity communication.

8. An apparatus for use with a transmission control element or function, the apparatus comprising at least one processing circuitry, and at least one non-transitory memory for storing instructions to be executed with the processing circuitry, wherein the at least one memory and the instructions are configured to, with the at least one processing circuitry, cause the apparatus at least:

to determine communication conditions of at least one communication link of an established multi-connectivity communication between a communication element and at least two communication network access points, to generate assistance information on the basis of the determined communication conditions, wherein the assistance information comprises at least an indication of a cost corresponding to an estimated probability of a successful transmission of a given data amount via the at least one communication link of the established multi-connectivity communication, comprising at least one of:

a portion of overall communication channel capacity, or a portion of currently unused communication channel capacity, to send the assistance information to a control element or function, to receive, from the control element or function, and process transmission control information indicating settings for a packet duplication control in the established multi-connectivity communication, wherein, in the packet duplication control, data to be communicated via the at least one communication link of the established multi-connectivity communication are duplicated for being transmittable via another communication link of the established multi-connectivity communication, and to conduct a transmission control for a packet duplication processing in the established multi-connectivity communication in accordance with the transmission control information.

9. The apparatus according to claim 8, wherein the assistance information further comprises at least one of
an indication of an estimated probability of an erroneous transmission via the at least one communication link of the established multi-connectivity communication,
an indication of an estimated probability of a successful transmission via the at least one communication link of the established multi-connectivity communication,
an indication of an estimated probability of an erroneous transmission of a given data amount via the at least one communication link of the established multi-connectivity communication,
an indication of an estimated probability of a successful transmission of a given data amount via the at least one communication link of the established multi-connectivity communication,
an indication of an estimated probability of an erroneous transmission of a given data amount within a predetermined time via the at least one communication link of the established multi-connectivity communication,
an indication of an estimated probability of a successful transmission of a given data amount within a predetermined time via the at least one communication link of the established multi-connectivity communication, or
an indication of a cost corresponding to an estimated probability of an erroneous transmission of a given data amount via the at least one communication link of the established multi-connectivity communication.

10. The apparatus according to claim 8, wherein the at least one memory and the instructions are further configured to, with the at least one processing circuitry, cause the apparatus at least, when processing the transmission control information,
to determine whether the packet duplication processing is conducted via the another communication link of the established multi-connectivity communication,
to enable or disable an automatic repeat processing for the packet duplication process via the another communication link of the established multi-connectivity communication, on the basis of the determination regarding the packet duplication processing via the another communication link,
to prepare a transmission in the packet duplication process at a specified timing for transmitting a duplicated packet via the another communication link of the established multi-connectivity communication,
to prepare a coordination with at least one other link used for the packet duplication process regarding an automatic repeat processing, and
to determine a reliability target to be achieved for the another communication link of the established multi-connectivity communication.

11. The apparatus according to claim 10, wherein the at least one memory and the instructions are further configured to, with the at least one processing circuitry, cause the apparatus at least, when processing the transmission control information, to give, for preparing the coordination with the at least one other link used for the packet duplication process regarding the automatic repeat processing, an uplink grant for the communication element to transmit an indication regarding acknowledgment or negative acknowledgment of reception via the another communication link of data corresponding to duplicated data.

12. The apparatus according to claim 8, wherein
the control element or function is a central network element connected to or a part of a packet data convergence protocol entity of a master network node of a cellular communication network capable of participating in a multi-connectivity communication with at least one communication element, wherein the communication element is a terminal device or user equipment communicating in the cellular communication network, and
the transmission control element or function being involved in the packet duplication process in the established multi-connectivity communication comprises at least one of a media access control entity of the master network node or a media access control entity of at least one secondary network node in the multi-connectivity communication.

13. An apparatus for use with a transmission control element or function, the apparatus comprising
at least one processing circuitry, and
at least one non-transitory memory for storing instructions to be executed with the processing circuitry, wherein the at least one memory and the instructions are configured to, with the at least one processing circuitry, cause the apparatus at least:
to determine communication conditions of at least one communication link of an established multi-connectivity communication between a communication element and at least two communication network access points, comprising causing the apparatus:
to calculate an estimated probability of an erroneous transmission via the at least one communication link or an estimated probability of a successful transmission via the at least one communication link on the basis of a connection quality with the communication element,
to estimate a data size that can be provided within a specified time period on the basis of a used modulation and coding scheme and an amount of available resources for the communication element, and
to determine a time budget for achieving a specific transmission performance,
to generate assistance information on the basis of the determined communication conditions,
to send the assistance information to a control element or function,
to receive, from the control element or function, and process transmission control information indicating settings for a packet duplication control in the established multi-connectivity communication, wherein, in the packet duplication control, data to be communicated via the at least one communication link of the established multi-connectivity communication are duplicated for being transmittable via another communication link of the established multi-connectivity communication, and to conduct a transmission control for a packet duplication processing in the established multi-connectivity communication in accordance with the transmission control information.

14. An apparatus for use with a transmission control element or function, the apparatus comprising
at least one processing circuitry, and
at least one non-transitory memory for storing instructions to be executed with the processing circuitry, wherein the at least one memory and the instructions are configured to, with the at least one processing circuitry, cause the apparatus at least:
to determine communication conditions of at least one communication link of an established multi-connectivity communication between a communication element and at least two communication network access points,
to generate assistance information on the basis of the determined communication conditions,
to decide to limit sending of the assistance information to a control element or function on the basis of a check as to whether or not current communication conditions are within a predefined range allowing to fulfill a previously received setting for the packet duplication control,
to send the assistance information to the control element or function,
to receive, from the control element or function, and process transmission control information indicating settings for the packet duplication control in the established multi-connectivity communication, wherein, in the packet duplication control, data to be communicated via the at least one communication link of the established multi-connectivity communication are duplicated for being transmittable via another communication link of the established multi-connectivity communication, and
to conduct a transmission control for a packet duplication processing in the established multi-connectivity communication in accordance with the transmission control information.

15. The apparatus according to claim 14, wherein the at least one memory and the instructions are further configured to, with the at least one processing circuitry, cause the apparatus at least, when determining the communication conditions of the at least one communication link of the established multi-connectivity communication,
to calculate an estimated probability of an erroneous transmission via the at least one communication link or an estimated probability of a successful transmission via the at least one communication link on the basis of a connection quality with the communication element,
to estimate a data size that can be provided within a specified time period on the basis of a used modulation and coding scheme and an amount of available resources for the communication element, and
to determine a time budget for achieving a specific transmission performance.

16. The apparatus according to claim 14, wherein the assistance information comprises at least one of
an indication of an estimated probability of an erroneous transmission via the at least one communication link of the established multi-connectivity communication,
an indication of an estimated probability of a successful transmission via the at least one communication link of the established multi-connectivity communication,
an indication of an estimated probability of an erroneous transmission of a given data amount via the at least one communication link of the established multi-connectivity communication,
an indication of an estimated probability of a successful transmission of a given data amount via the at least one communication link of the established multi-connectivity communication,
an indication of an estimated probability of an erroneous transmission of a given data amount within a predetermined time via the at least one communication link of the established multi-connectivity communication,
an indication of an estimated probability of a successful transmission of a given data amount within a predetermined time via the at least one communication link of the established multi-connectivity communication,
an indication of a cost corresponding to an estimated probability of a successful transmission of a given data amount via the at least one communication link of the established multi-connectivity communication, or
an indication of a cost corresponding to an estimated probability of an erroneous transmission of a given data amount via the at least one communication link of the established multi-connectivity communication.

17. The apparatus according to claim 16, wherein the cost corresponding to an estimated probability of a successful transmission of a given data amount via the at least one communication link of the established multi-connectivity communication comprises at least one of
a portion of overall communication channel capacity, or
a portion of currently unused communication channel capacity.

18. The apparatus according to claim 14, wherein the at least one memory and the instructions are further configured to, with the at least one processing circuitry, cause the apparatus at least, when processing the transmission control information,
to determine whether the packet duplication processing is conducted via the another communication link of the established multi-connectivity communication,
to enable or disable an automatic repeat processing for the packet duplication process via the another communication link of the established multi-connectivity communication, on the basis of the determination regarding the packet duplication processing via the another communication link,
to prepare a transmission in the packet duplication process at a specified timing for transmitting a duplicated packet via the another communication link of the established multi-connectivity communication,
to prepare a coordination with at least one other link used for the packet duplication process regarding an automatic repeat processing, and
to determine a reliability target to be achieved for the another communication link of the established multi-connectivity communication.

19. The apparatus according to claim 18, wherein the at least one memory and the instructions are further configured to, with the at least one processing circuitry, cause the apparatus at least, when processing the transmission control information, to give, for preparing the coordination with the at least one other link used for the packet duplication process regarding the automatic repeat processing, an uplink grant for the communication element to transmit an indication regarding acknowledgment or negative acknowledgment of reception via the another communication link of data corresponding to duplicated data.

20. The apparatus according to claim 14, wherein
the control element or function is a central network element connected to or a part of a packet data convergence protocol entity of a master network node of a cellular communication network capable of participating in a multi-connectivity communication with at least one communication element, wherein the communication element is a terminal device or user equipment communicating in the cellular communication network, and
the transmission control element or function being involved in the packet duplication process in the established multi-connectivity communication comprises at least one of a media access control entity of the master network node or a media access control entity of at least one secondary network node in the multi-connectivity communication.

* * * * *